United States Patent
Takayama

(10) Patent No.: US 8,061,845 B2
(45) Date of Patent: Nov. 22, 2011

(54) IMAGE DISPLAY SYSTEM AND IMAGE DISPLAY METHOD

(75) Inventor: Haruhisa Takayama, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 749 days.

(21) Appl. No.: 12/213,373

(22) Filed: Jun. 18, 2008

(65) Prior Publication Data
US 2008/0258996 A1 Oct. 23, 2008

Related U.S. Application Data

(63) Continuation-in-part of application No. PCT/JP2006/325111, filed on Dec. 15, 2006.

(30) Foreign Application Priority Data

Dec. 19, 2005 (JP) ................................. 2005-364302

(51) Int. Cl.
*G03B 21/14* (2006.01)
*G09G 5/00* (2006.01)

(52) U.S. Cl. .............. 353/30; 353/94; 349/15; 359/456; 359/466

(58) Field of Classification Search .............. 353/7, 10, 353/30, 94, 121; 359/462, 466, 478, 458; 345/1.3, 7, 8, 9, 173; 349/15
See application file for complete search history.

(56) References Cited

U.S. PATENT DOCUMENTS

| | | | |
|---|---|---|---|
| 6,201,517 B1 | 3/2001 | Sato | |
| 6,400,364 B1 | 6/2002 | Akisada et al. | |
| 7,086,735 B1 * | 8/2006 | Provitola | 353/10 |
| 7,428,001 B2 * | 9/2008 | Schowengerdt et al. | 348/51 |
| 7,710,647 B2 * | 5/2010 | Takahashi | 359/464 |
| 2002/0126065 A1 | 9/2002 | Ophey | |
| 2003/0071924 A1 | 4/2003 | Yamazaki et al. | |
| 2004/0135973 A1 * | 7/2004 | Gustafsson et al. | 353/10 |
| 2005/0052617 A1 * | 3/2005 | Fujikawa et al. | 353/10 |
| 2006/0146125 A1 * | 7/2006 | Yamada | 348/51 |
| 2006/0197832 A1 | 9/2006 | Yamada et al. | |

(Continued)

FOREIGN PATENT DOCUMENTS

EP 1 309 893 B1 10/2006

(Continued)

OTHER PUBLICATIONS

Supplementary European Search Report for corresponding European Patent Application No. 06834838.2, mailed on Dec. 1, 2010.

(Continued)

*Primary Examiner* — William C Dowling
(74) *Attorney, Agent, or Firm* — Oliff & Berridge, PLC

(57) ABSTRACT

A viewing angle can be broadened without causing degradation in resolution of a three-dimensional image by a retinal scanning display. An image display system includes a projector which displays an image in a first region by projecting an image onto a screen, and a retinal scanning display which displays an image in a second region provided in the first region by projecting the image onto a pupil of a user. A position for displaying a three-dimensional content out of the image to be displayed in the first region is determined. The three-dimensional content is displayed on the retinal scanning display when the position falls within the second region, while the three-dimensional content is displayed on the projector when the position falls outside the second region.

12 Claims, 16 Drawing Sheets

U.S. PATENT DOCUMENTS

| | | | | |
|---|---|---|---|---|
| 2006/0232665 A1* | 10/2006 | Schowengerdt et al. | ....... | 348/51 |
| 2010/0103077 A1* | 4/2010 | Sugiyama et al. | ................ | 345/8 |
| 2010/0277803 A1* | 11/2010 | Pockett et al. | ................ | 359/567 |
| 2011/0122049 A1* | 5/2011 | Lvovskiy et al. | .............. | 345/1.3 |

FOREIGN PATENT DOCUMENTS

| | | |
|---|---|---|
| JP | A-3-96913 | 4/1991 |
| JP | A-6-259031 | 9/1994 |
| JP | A-6-308924 | 11/1994 |
| JP | A-10-334275 | 12/1998 |
| JP | B2-2874208 | 1/1999 |
| JP | A-2004-506237 | 2/2004 |
| JP | A-2005-91610 | 4/2005 |
| JP | A-2005-258022 | 9/2005 |
| WO | WO 99/36903 | 7/1999 |
| WO | WO 02/12949 A2 | 2/2002 |
| WO | WO 2005/043218 A1 | 5/2005 |

OTHER PUBLICATIONS

Jul. 29, 2011 Office Action issued in European Application No. 06834838.2.

* cited by examiner

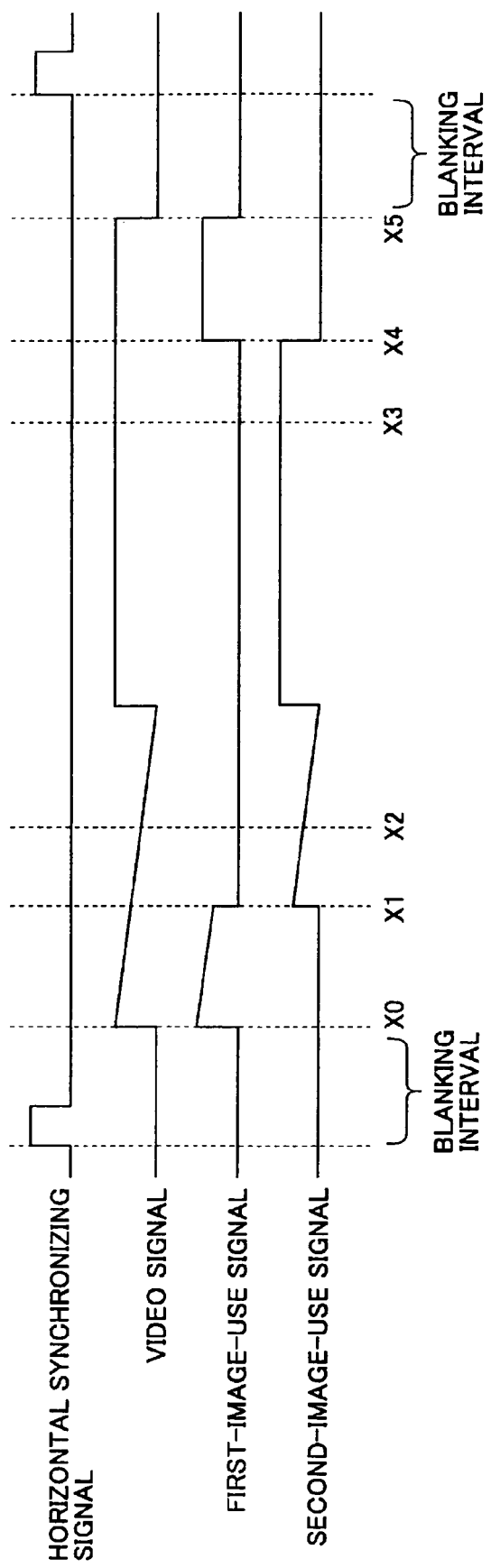

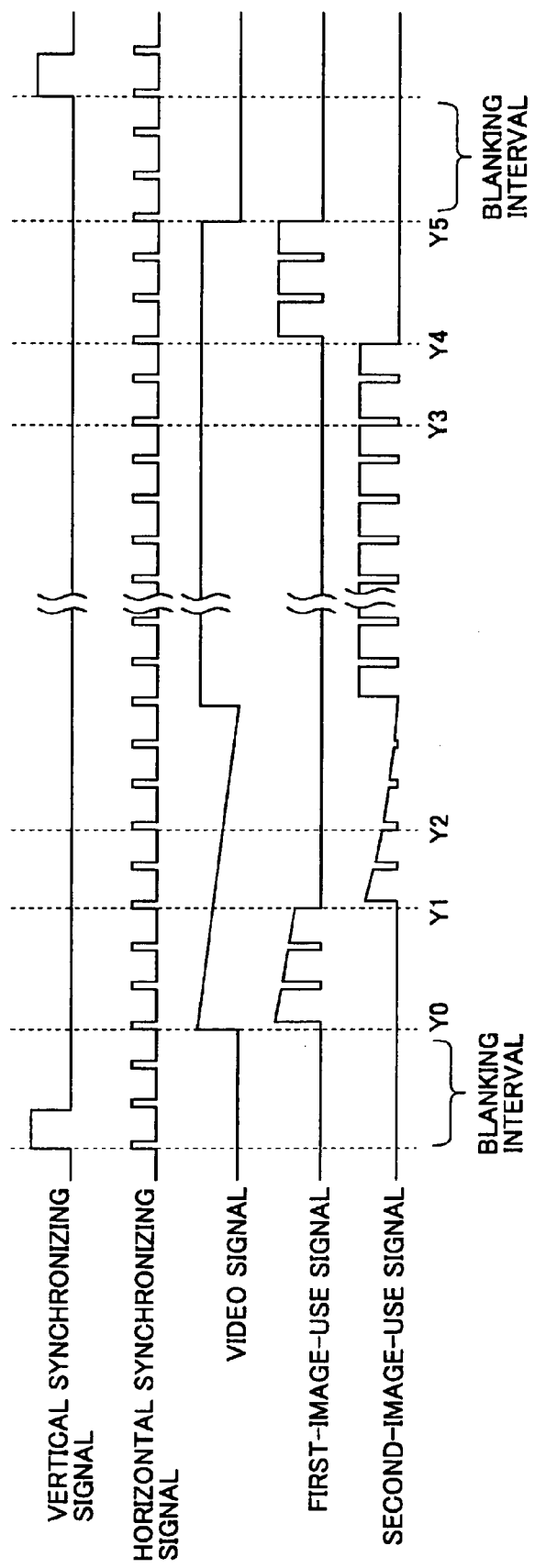

CENTER POSITION

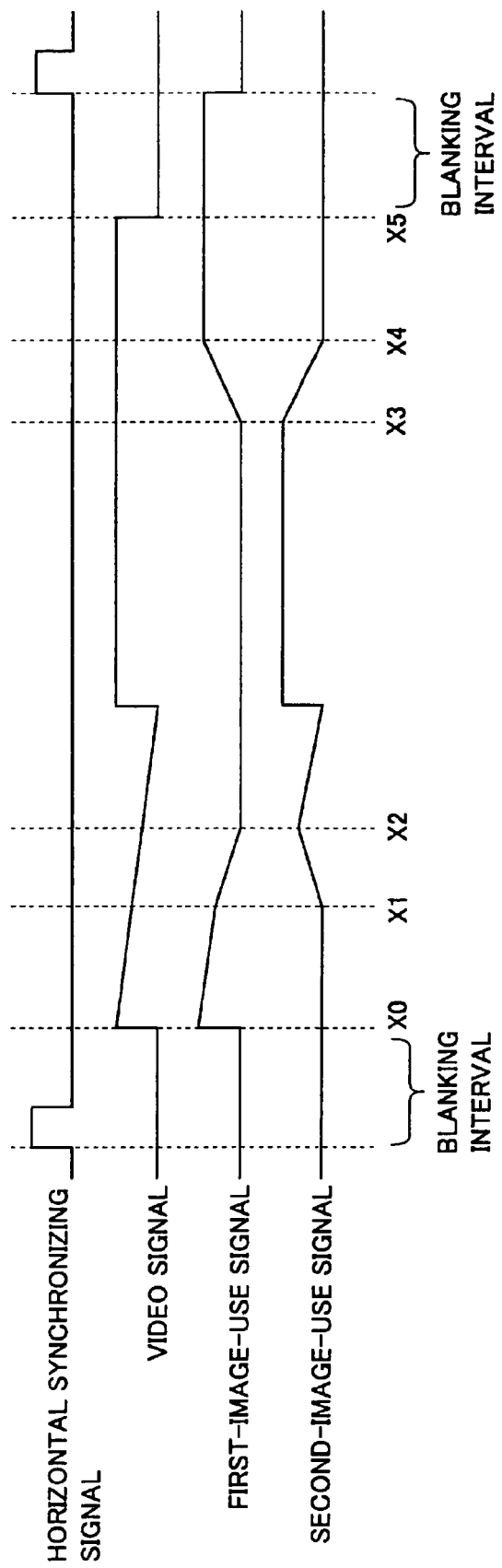

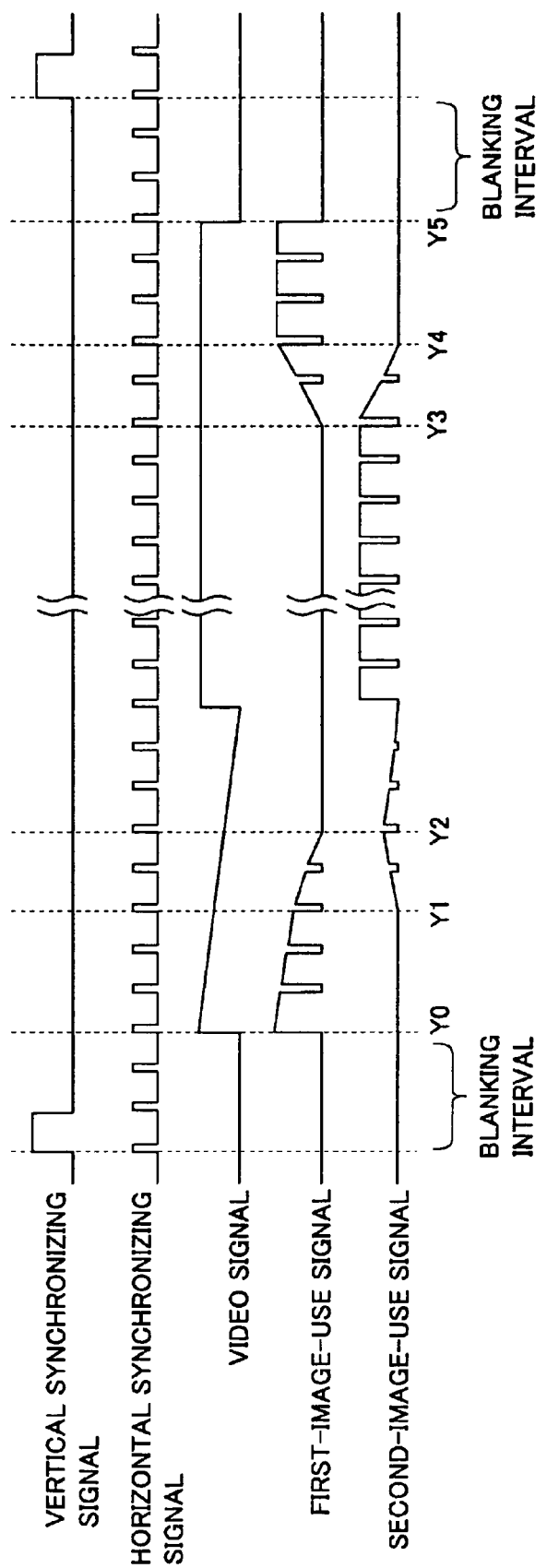

IMAGE DISPLAY SYSTEM AND IMAGE DISPLAY METHOD

CROSS-REFERENCE TO RELATED APPLICATIONS

The present application is a Continuation-in-Part of International Application PCT/JP2006/325111 filed on Dec. 15, 2006, which claims the benefits of Japanese Patent Application No. 2005-364302 filed on Dec. 19, 2005.

BACKGROUND OF THE INVENTION

1. Field of the Invention

The present invention relates to an image display system having a plurality of image display devices, and more particularly to an image display system which includes an image display device capable of displaying an image on a screen or the like and an image display device capable of projecting an image onto a pupil of a user.

2. Description of the Related Art

Recently, various proposals have been made with respect to an image display device which allows incidence of an optical flux on a pupil of a viewer and projects an image on a retina using the incident optical flux thus allowing the viewer to observe a stereoscopic virtual image in front of the pupil, that is, a so-called retinal scanning display.

One conventional example of this-type image display device is described in patent document 1 (Japanese Patent No. 2874208). The conventional example is constituted of a plurality of constitutional elements and displays an image to a viewer.

That is, the image display device includes an optical flux generating part capable of radiating an optical flux and modulating intensity of the radiated optical flux, a wave front curvature modulator for modulating a wave front curvature of the optical flux radiated from the optical flux generating part, a deflector for scanning the optical flux whose wave front curvature is modulated by the wave front curvature modulator, and a relay optical system for allowing the optical flux scanned by the deflector to be incident on a pupil of the viewer.

Further, due to the incidence of the optical flux scanned by the deflector on a retina of the viewer, an image is directly projected on the retina, and the viewer can observe a stereoscopic virtual image in front of his/her pupil.

SUMMARY OF THE INVENTION

However, with respect to the retinal scanning display disclosed in patent document 1, when the retinal scanning display is operated by inputting video signals used in general such as NSTC-method video signals so as to broaden a viewing angle of an image to be observed by a viewer, the resolution is degraded thus lowering quality of an image.

Further, in an attempt to broaden a viewing angle without degrading the resolution of the image in the retinal scanning display, video signals of large dot number become necessary and hence, it is difficult to provide a retinal scanning display of high general-use property.

To overcome the above-mentioned drawbacks, according to one aspect of the present invention, there is provided an image display system which includes: a first image display device which displays a first image in a first region; a second image display device which displays a second image in a second region provided in the first region by projecting an image onto a pupil of a user; a determination part which determines a position for displaying a specified image out of the image to be displayed in the first region; and a display control part which allows the second image display device to display the specified image as the second image when it is determined by the determination part that a position for displaying the specified image falls within the second region, and allows the first image display device to display the specified image as the first image when it is determined by the determination part that the position for displaying the specified image falls outside the second region.

To overcome the above-mentioned drawbacks, according to another aspect of the present invention, there is provided an image display method for displaying an image on a first image display device which displays a first image in a first region and a second image display device which displays a second image in a second region provided in the first region by projecting an image onto a pupil of a user, the image display method including the steps of: determining a position for displaying a specified image out of the image to be displayed in the first region; and allowing the second image display device to display the specified image as the second image when it is determined that a position where the specified image is to be displayed falls within the second region, and allowing the first image display device to display the specified image as the first image when it is determined that the position where the specified image is to be displayed falls outside the second region.

BRIEF DESCRIPTION OF THE DRAWINGS

FIG. 7A and FIG. 7B are explanatory views of the manner of operation for determining a display position of three-dimensional content from a waveform of a video signal in the image distribution circuit of the first embodiment;

FIG. 14A and FIG. 14B are explanatory views of the manner of operation for determining a display position of three-dimensional content from a waveform of a video signal in the image distribution circuit of the third embodiment.

PREFERRED EMBODIMENTS OF THE INVENTION

First Embodiment

Hereinafter, a specific embodiment of the present invention is explained in detailed in conjunction with drawings.

[Constitution of Image Display System S]

Figure 1:
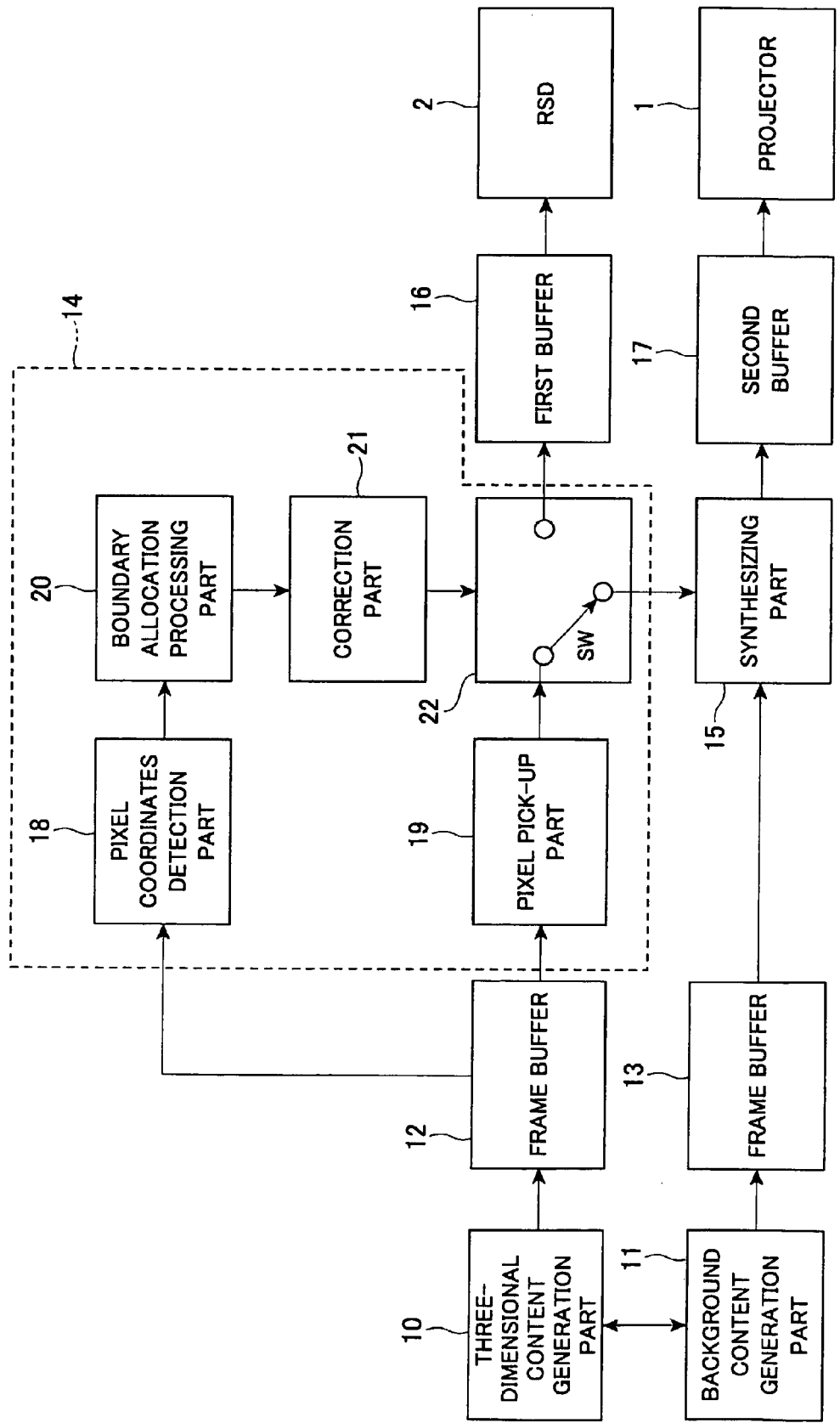
FIG. 1 is a view showing the overall constitution of an image display system according to an embodiment of the present invention.

First of all, the overall constitution of the image display system S is explained in conjunction with drawings. FIG. 1 is a view showing the overall constitution of the image display system S.

As shown in FIG. 1, the image display system S of this embodiment includes a projector 1 corresponding to one example of a first image display device and a retinal scanning display 2 (hereinafter, also referred to as "RSD") as a retinal scanning display (retinal imaging display) corresponding to one example of a second image display device, allocates an image to be displayed on these image display devices properly so as to broaden a viewing angle of an image and, at the same time, holds reality due to a three-dimensional image.

Figure 2:
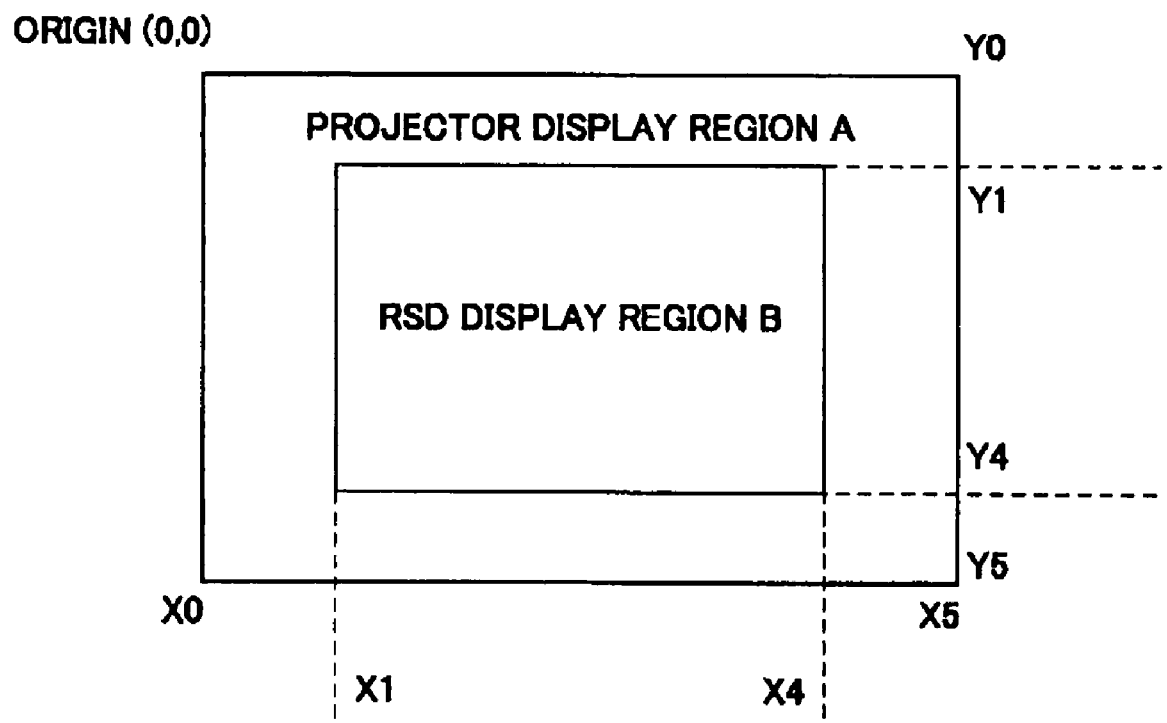
FIG. 2 is an explanatory view of a display region in the image display system.

That is, as shown in FIG. 2, the projector 1, by projecting the image on a screen such as a wall surface, displays a two-dimensional image corresponding to a first Image on a projector display region A (X coordinates; X0 to X5, Y coordinates: Y0 to Y5) which constitutes a visual first region as viewed from a user as a viewer and, at the same time, the retinal scanning display 2 projects a three-dimensional image corresponding to a second image on an RSD display region 1 (X coordinates: X1 to X4, Y coordinates: Y1 to Y4) which constitutes a second region provided in the first region by projecting the image on a pupil of the user.

The image display system S includes, as shown in FIG. 1, a three-dimensional content generation part 10 for generating video signals for displaying the three-dimensional stereoscopic image (hereinafter, referred to as "three-dimensional content") and a background content generation part 11 for generating video signals for displaying a two-dimensional background content image (hereinafter, referred to as "background image").

The three-dimensional content generated by the three-dimensional content generation part 10 is allocated to a three-dimensional display by the retinal scanning display 2 and a second-dimensional display by the projector 1 under a predetermined condition. Further, the background image generated by the background content generation part 11 is two-dimensionally displayed on the screen by the projector 1. Here, the three-dimensional content generation part 10 and the background content generation part 11 are constituted to output video signals in synchronism. Further, these parts are controlled by a control part not shown in the drawing.

In this manner, to allocate the three-dimensional content image to the retinal scanning display 2 and the projector 1, the image display system S includes a first frame buffer 12, a second frame buffer 13, an image distribution circuit 14, a synthesizing part 15, a first buffer 16 and a second buffer 17. Here, these parts are controlled by a control part not shown in the drawing.

The first frame buffer 12 buffers video signals for displaying a three-dimensional content as image data for every frame, while the second frame buffer 13 buffers video signals for displaying a background image as image data for every frame.

The image data formed of three-dimensional content buffered by the first frame buffer 12 is sequentially picked up for every pixel unit by the image distribution circuit 14 and, at the same time, a display position for every picked-up pixel (coordinates in the vertical X direction, lateral Y direction and depth Z direction. Hereinafter, referred to as "three-dimensional pixel coordinates") is detected.

Here, the image distribution circuit 14 determines which the image is to be displayed on, the projector display region A or the RSD display region B, based on information of the three-dimensional pixel coordinates.

That is, the image distribution circuit 14 functions as a determination part for determining the position for displaying the three-dimensional content corresponding to one example of a specified image. Further, the image distribution circuit 14 functions as a display control part and allows the retinal scanning display to display the three-dimensional content as a three-dimensional image upon determination that the position at which the three-dimensional content to be displayed falls within the RSD display region B, while allows the projector 1 to display the three-dimensional content as a two-dimensional image upon determination that the position at which the three-dimensional content to be displayed falls outside the RSD display region B.

Further, the image distribution circuit 14 controls, when it is determined that a plurality of three-dimensional pixel coordinates which constitute the three-dimensional content strides over the inside and outside of the RSD display region B, to display the image portion in the RSD display region B out of the three-dimensional content as a three-dimensional image by the retinal scanning display 2 and to display the image portion outside the RSD display region B out of the three-dimensional content as the second-dimensional image by the projector 1.

Here, the image distribution circuit 14 includes the pixel coordinates determination part 18 which functions as the above-mentioned determination part, and includes a pixel pick-up part 19, a boundary allocation processing part 20, a correction part 21 and a switch part 22 which function as the above-mentioned display control part.

The image data buffered by the first frame buffer 12 is sequentially picked up as RGB data per pixel unit (hereinafter, referred to as "pixel image") by the pixel coordinates detection part 18 and, at the same time, the three-dimensional pixel coordinates are detected for every pixel image formed of the three-dimensional content out of the picked-up pixel images. Here, whether or not the pixel image is the three-dimensional content is determined depending on whether or not the pixel coordinates are the three-dimensional pixel coordinates by the pixel coordinate detection part 18. That is, it is determined whether or not the coordinates in the depth Z direction is included in the pixel coordinates. Further, the picking up of the pixel image by the pixel coordinate detection part 18 may be performed from the three-dimensional content generation part 10 instead of the first frame buffer 12.

Here, based on information of the three-dimensional pixel coordinates from the pixel coordinate detection part 18, the boundary allocation processing part 20 determines on which region, the projector display region A or the RSD display region B, the pixel image to be displayed.

Further, the correction part 21 has a function for calculating brightness, a correction value of color and a correction value with respect to the depth Z of the three-dimensional display for pixel unit under the predetermined condition.

The switch part 22, corresponding to the determination result by the pixel coordinate detection part 18, selects either one of the projector 1 and the retinal scanning display 2 and outputs the pixel image which is sequentially picked up by the pixel pick-up part 19 to the selected device. That is, the pixel image which is sequentially picked up by the pixel pick-up part 19 is sequentially outputted to either of the first buffer 16 or the synthesizing part 15. Further, the switch part 22, based on the correction value calculated by the correction part 21, performs the correction of the brightness, color and depth of the pixel image which is sequentially picked up by the pixel pick-up part 19, and the pixel image after correction can be sequentially outputted to either one of the first buffer 16 and the synthesizing part 15. Here, the pixel image outputted to the synthesizing part 15 by the switch part 22 is referred to as a first-image-use signal and the pixel image outputted to the first buffer 16 by the switch part 22 is referred to a second-image-use signal.

The pixel image outputted to the first buffer 16 in this manner is outputted to the retinal scanning display 2 as the video signal having a predetermined form.

On the other hand, with respect to the image data buffered by the second frame buffer 13, the pixel image thereof is sequentially picked up by the synthesizing part 15 and, at the same time, when the pixel image is outputted from the switch part 22, the pixel image is synthesized with the pixel image from the switch part 22.

The pixel image synthesized in this manner is outputted to the second buffer 17 and outputted to the projector 1 as the video signal having the predetermined form.

As described above, the image having the three-dimensional content generated by the three-dimensional content generation part 10 is allocated to the three-dimensional display by the retinal scanning display 2 and to the two-dimensional display by the projector 1 by the image distribution circuit under a predetermined condition. Further, the background image generated by the background content generation part 11 is two-dimensionally displayed on the screen by the projector 1.

Hereinafter, the constitution of the projector 1 and the constitution of the retinal scanning display 2 are explained and, thereafter, the control operation of the image distribution circuit 14 is further specifically explained.

[Constitution of Projector 1]

Figure 3:
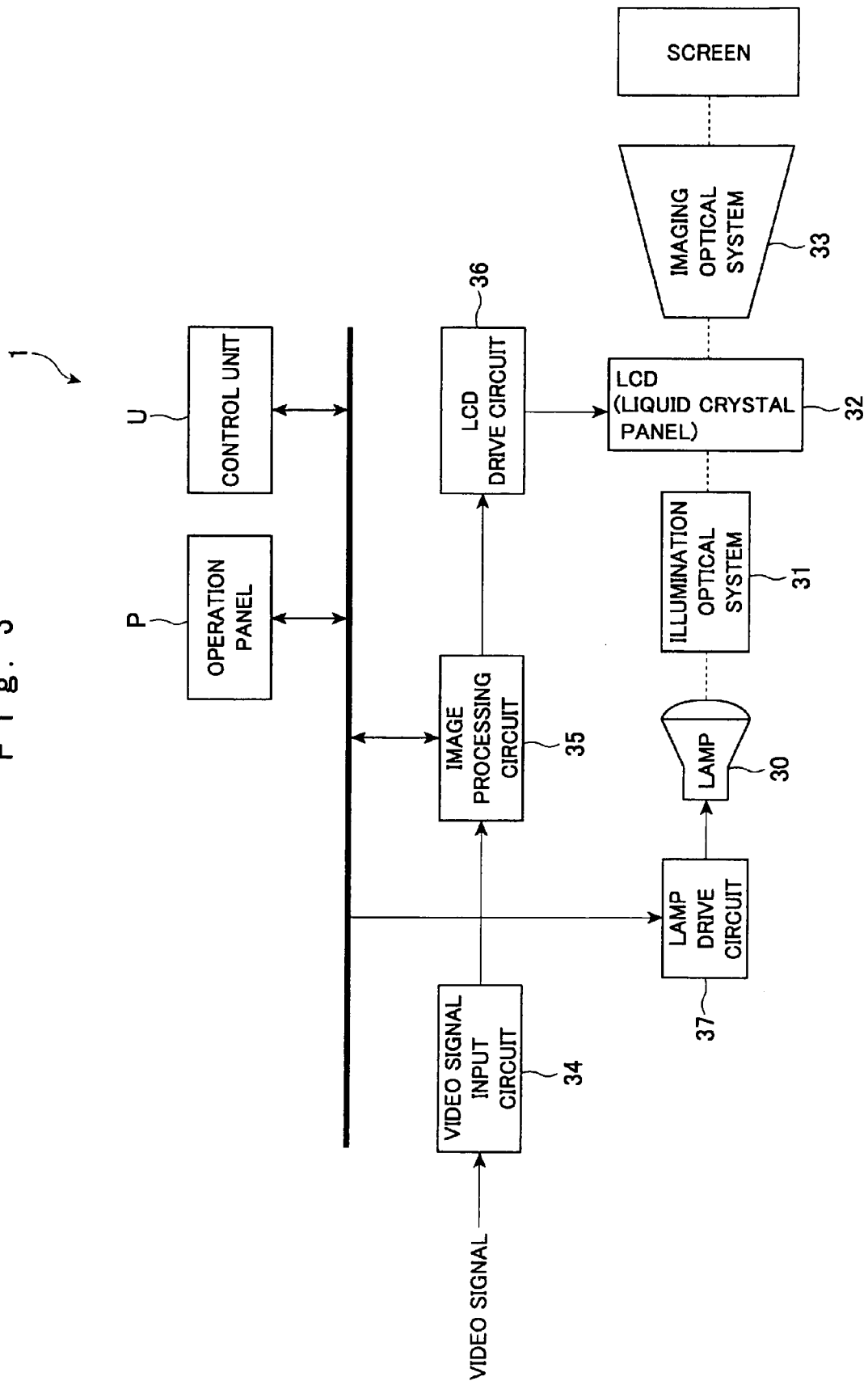
FIG. 3 is a view showing the constitution of a projector in the image display system.

The projector 1 of the embodiment according to the present invention is shown in FIG. 3. The projector 1 is a device which displays a two-dimensional image on the visual projector display region A as viewed from the user by projecting the image on a screen such as a wall surface.

As shown in FIG. 3, the projector 1 includes an operation panel P, a control unit U having a microcomputer, a lamp 30 as a light source, an illumination optical system 31, a transmissive liquid crystal panel 32 (hereinafter, referred to as "LCD 32"), an imaging optical system 33, a video signal input circuit 34, an image processing circuit 35, an LCD drive circuit 36 and a lamp drive circuit 37, and these parts are housed in a housing.

The operation panel P is mounted on a portion of the projector which is operable by the user, that is, on a suitable portion of an outer wall surface of the housing, and the user operates the operation panel P so as to perform the operation control and the operation stop control of the control unit U.

The lamp 30 is turned on in response to a signal outputted from the lamp drive circuit 37 controlled by the control unit U and emits light. The light emitted from the lamp 30 is radiated to the LCD 32 as an illumination light by the illumination optical system 31.

The video signal input circuit 34 inputs the video signals inputted from outside the projector 1 to the image processing circuit 35. The image processing circuit 35, based on the control by the control unit U, performs processing such as addition of a signal or a change of a signal with respect to the inputted video signal. The video signals processed in this manner are inputted to the LCD drive circuit 36.

The LCD 32 is driven by the LCD drive circuit 36 and displays an image on the display surface thereof. The image displayed in this manner is radiated from the LCD 32 as light by the illumination light from the illumination optical system 31. Next, the radiated light passes through the imaging optical system 33 and is projected on the screen which constitutes the projection surface. In this manner, the image displayed on the LCD 32 is projected on the screen.

[Constitution of Retinal Scanning Display 2]

Figure 4:
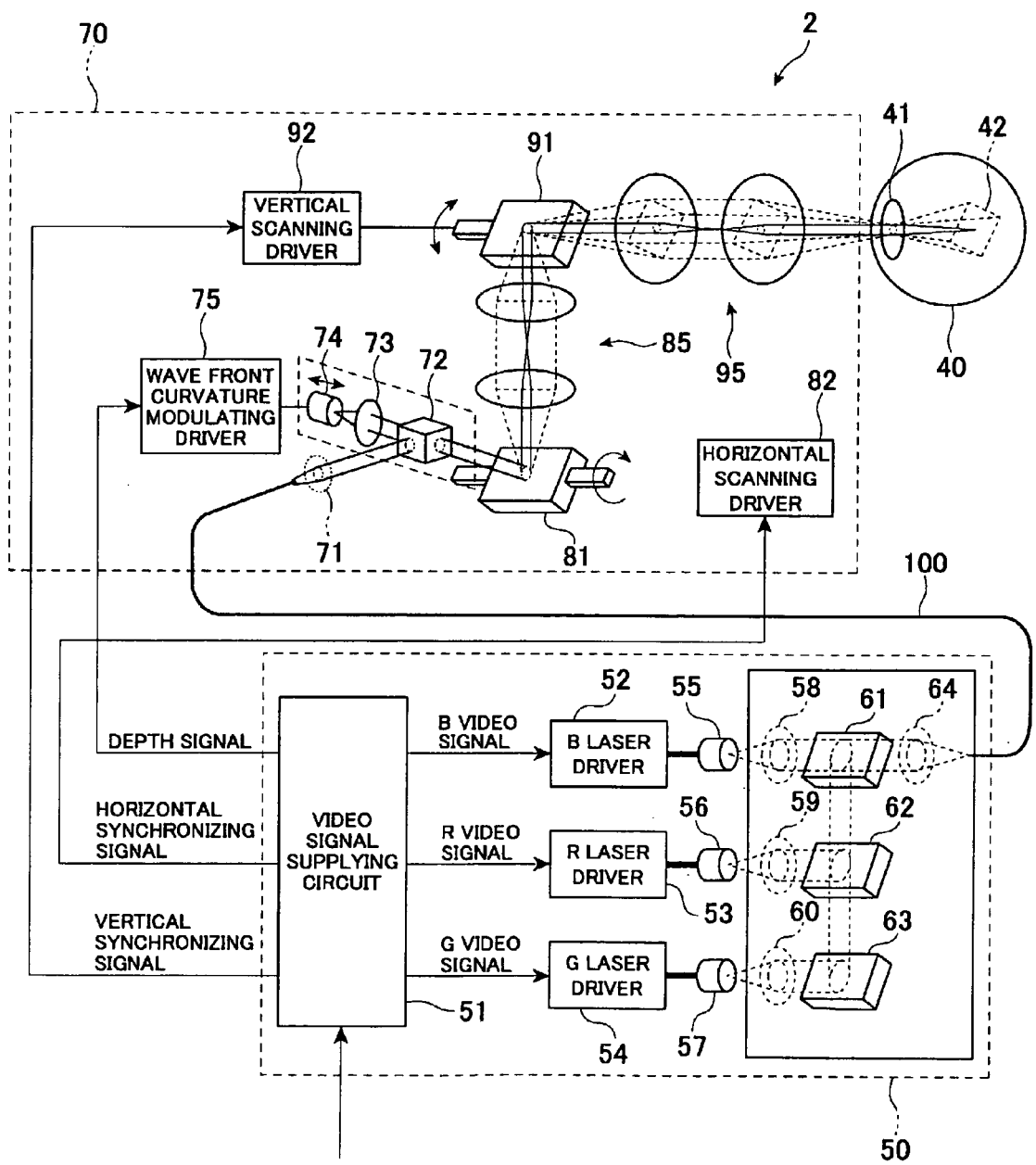
FIG. 4 is a view showing the constitution of a retinal scanning display in the image display system.

The retinal scanning display 2 of an embodiment of the present invention is shown in FIG. 4. The retinal scanning display 2 is a device which allows the incidence of an optical flux on a pupil 41 of a viewer who is an user of the retinal scanning display 2 to project an image on the retina 42 thus allowing the viewer to visually recognize a stereoscopic virtual image in the RSD display region B in front of the pupil 41 of a viewer's eye 40.

The retinal scanning display 2 includes an optical flux generating part 50 for generating an optical flux whose intensity is modulated based on video signals supplied from the outside. Further, the retinal scanning display 2 includes, between the optical flux generating part 50 and the viewer's eye 40, a scanning device 70 which constitutes a scanning mechanism for scanning the laser optical flux generated by the optical flux generating part 50 in the horizontal direction as well as in the vertical direction for image display and for radiating the optical flux subjected to the scanning or the like to the pupil 41 in this manner by performing depth adjustment.

Further, the retinal scanning display 2 mounts the optical flux generating part 50 and the scanning device 70 thereon respectively corresponding to left and right pupils 41 of the viewer, and these parts are controlled by a control part not shown in the drawing.

As shown in FIG. 4, the optical flux generating part 50 includes a video signal supplying circuit 51 to which a video signal supplied from the outside is inputted and which generates respective signals constituting components for synthesizing an image based on the video signal. In the video signal supplying circuit 21, respective video signals of blue (B), green (G) and red (R) are generated and are outputted. Further, the video signal supplying circuit 51 outputs horizontal synchronizing signals, vertical synchronizing signals and depth signals used in the scanning device 70.

Further, the optical flux generating part 50 includes respective lasers 55, 56, 57 for generating blue, red and green optical fluxes and laser drivers 52, 53, 54 for driving the respective lasers 55, 56, 57. Here, the respective lasers 52, 56, 57 may be constituted of a semiconductor laser such as a laser diode or a solid-state laser, for example.

In the optical flux generating part 50, the laser beams radiated from the respective lasers 55, 56, 57 are, after respectively being collimated by the collimation optical systems 58, 59, 60, allowed to be incident on the dichroic mirrors 61, 62, 63. Thereafter, using these dichroic mirrors 61, 62, 63, the respective lasers are reflected or are allowed to pass through selectively with respect to wavelengths thereof. The dichroic mirror 63 may be a full reflection mirror.

Here, laser optical fluxes of three primary colors which are respectively incident on these dichroic mirrors 61, 62, 63 are finally incident on one dichroic mirror 61 which represents three dichroic mirrors 61, 62, 63 and are coupled together in the dichroic mirror 61 and, thereafter, the coupled optical fluxes are condensed by a condensing optical system 64 and are outputted to the optical fiber 100.

Next, the scanning device 70 is explained.

The scanning device 70 includes, to change the wave front curvature of the laser optical flux radiated from the optical fiber 100, the collimation optical system 71 for collimating the optical flux again, a beam splitter 72 for separating the optical flux collimated in this manner into transmission light and reflection light reflected in the direction vertical to the transmission light, a convex lens 73 having a focal length f which converges the laser optical flux reflected by the beam splitter 72 and a movable mirror 74 which reflects the laser optical flux converged by the convex lens 73 in the incident direction.

Here, the movable mirror 74 is displaced in the direction approaching the convex lens 73 or the direction separating from the convex lens 73 by a wave front curvature modulating driver 75. That is, by changing a distance between the convex lens 73 and the movable mirror 74 by the wave front curvature modulating driver 75, it is possible to change the wave front curvature of the laser optical flux. By changing the wave front curvature, it is possible to change the depth of the image displayed on the retinal scanning display 2.

In this manner, the laser optical flux incident from the optical fiber 100 is reflected by the beam splitter 72 and passes through the convex lens 73 and, thereafter, is reflected by the movable mirror 74 and, again passes through the convex lens 73 and, thereafter, passes through the beam splitter 72 and is radiated to the horizontal scanning part.

The horizontal scanning part includes a Galvano mirror 81 for scanning the optical flux in the horizontal direction and a horizontal scanning driver 82 for driving the Galvano mirror 81. The vertical scanning part includes a Galvano mirror 91 for scanning the optical flux in the vertical direction and a vertical scanning driver 92 for driving the Galvano mirror 91.

Further, the retinal scanning display 2 includes a relay optical system 85 for relaying the optical flux between the horizontal scanning part and the vertical scanning part. The optical flux whose wave front curvature is modulated is scanned in the horizontal direction by the Galvano mirror 81 and is scanned in the vertical direction by the Galvano mirror 91 and is radiated to the second relay optical system 95.

In this manner, the retinal scanning display 2 inputs the video signals, generates laser optical flux whose intensity is modulated in response to the video signals, scans the generated laser optical flux in the horizontal and vertical directions, modulates the wave front curvature, allows the optical flux to be incident on the pupil 41 from the second relay optical system 95 and projects the image on the retina 42 so as to allow the viewer to visually recognize a stereoscopic virtual image in the RSD display region B in front of the pupil 41 of the viewer's eye 40.

[Specific Manner of Operation of Image Distribution Circuit 14]

Figure 5A:
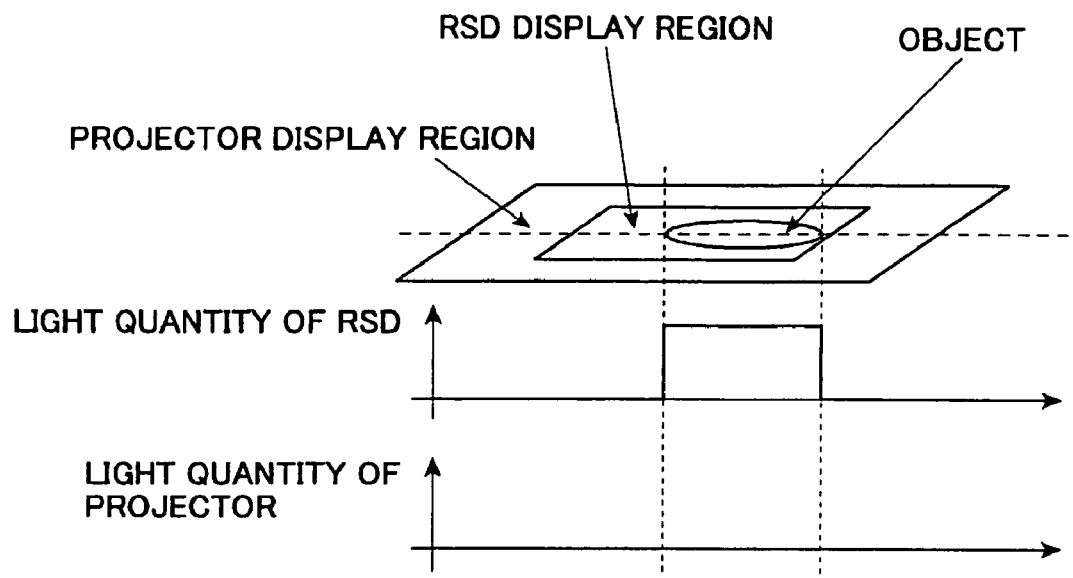
FIG. 5A and FIG. 5B are explanatory views of the manner of operation of an image distribution circuit of a first embodiment.
Figure 5B:
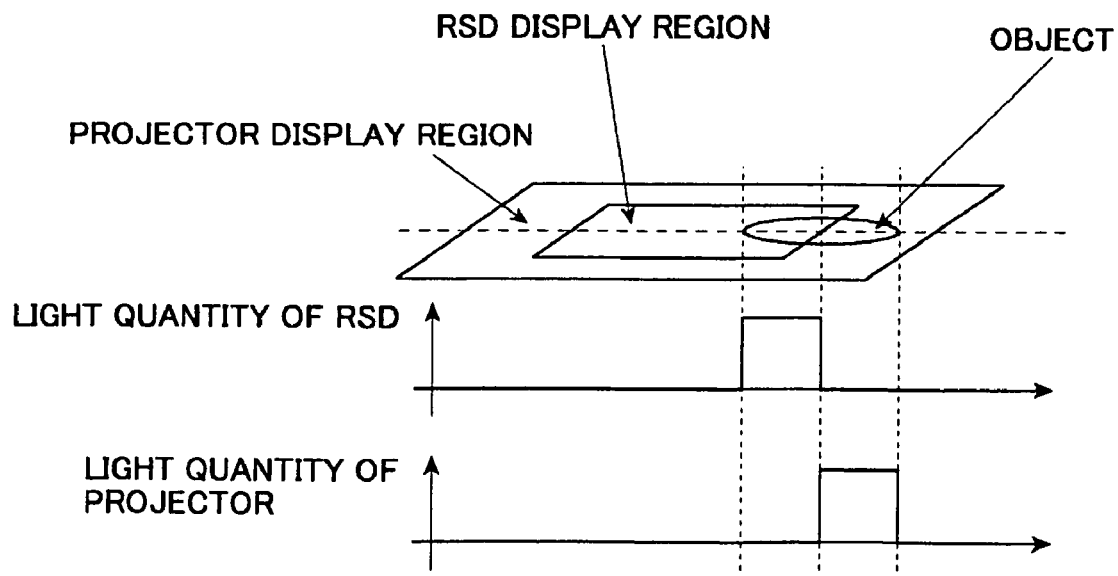

Next, the specific manner of operation of the image distribution circuit 14 is explained in conjunction with the drawings. FIG. 5A and FIG. 5B are explanatory views of the manner of operation of t image distribution circuit 14, and FIG. 6 is a flow chart of the operation of the image distribution circuit 14.

The image distribution circuit 14 of this embodiment, when a three-dimensional content image strides over the inside and the outside of the RSD display region B as shown in FIG. 5B, displays an image portion in an RSD display region B out of the three-dimensional content as a three-dimensional image by the retinal scanning display 2, and displays an image portion outside the RSD display region B out of the three-dimensional content image as a two-dimensional image by the projector 1. The manner of operation of the image distribution circuit 14 is explained hereinafter.

Figure 6:
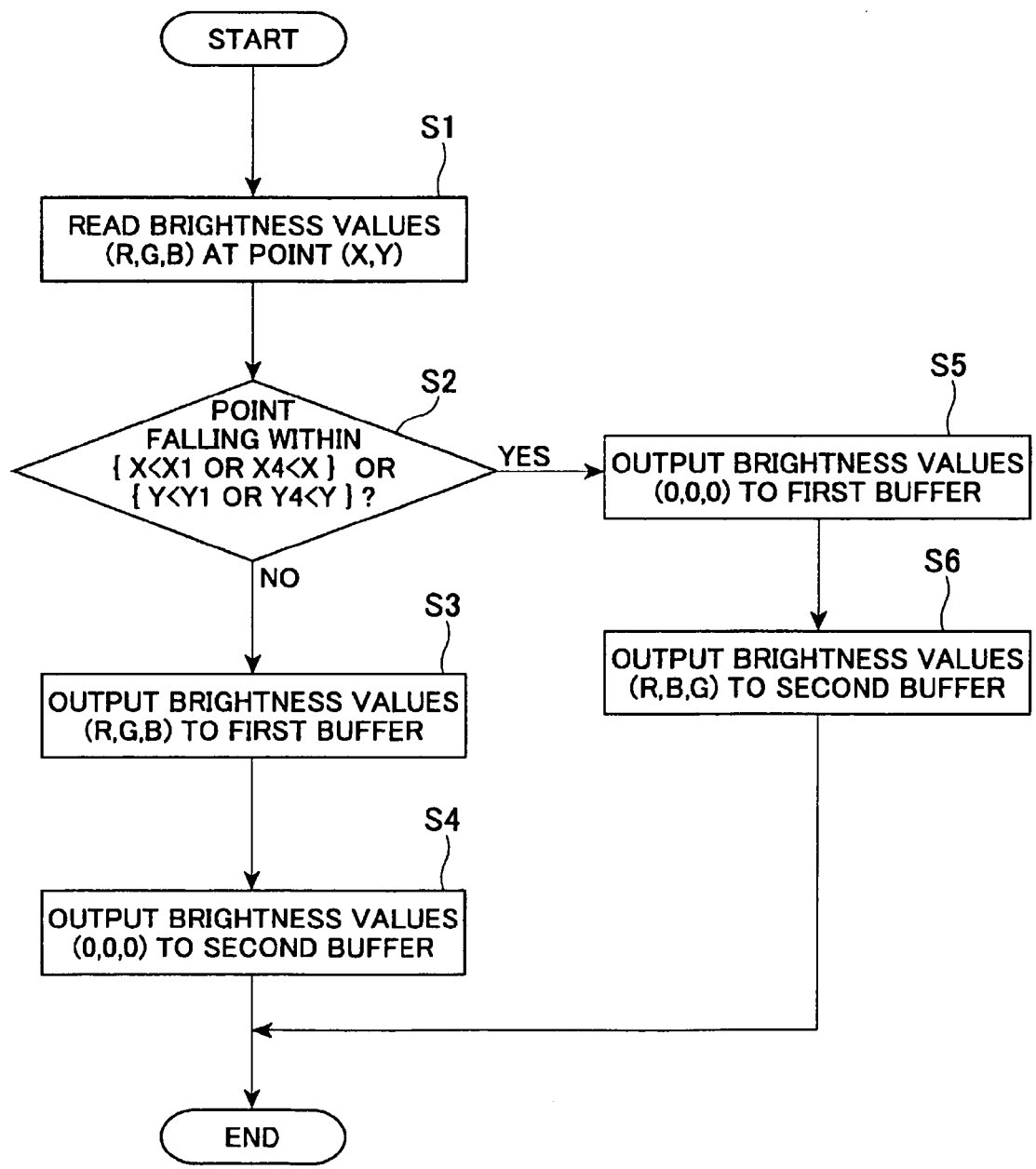
FIG. 6 is a flow chart of the manner of operation of the image distribution circuit of the first embodiment.

First of all, when an operation of the image display system S is started, as shown in FIG. 6, a three-dimensional content is generated by a three-dimensional content generation part 10, is outputted to the first frame buffer 12, and is buffered in the first frame buffer 12 for every frame unit. Image data (data including pixel images of X5×Y5) formed of three-dimensional content corresponding to one frame buffered by the first frame buffer 12 is sequentially read by the pixel coordinates detection part 18 such that the brightness values (R,G,B) of the pixel images at points (X,Y) are sequentially read in order from the pixel image at a point (0, 0) to the pixel image at a point (X5,Y5) through the pixel image at a point (1, 0), . . . , the pixel image at a point (X5, 0), the pixel image at a point (0, 1), . . . , and the pixel image at a point (X5, 1) (Step S1).

Next, the pixel coordinates detection part 18 determines whether or not the display positions (X,Y) of the sequentially-read pixel images fall within a range of X<X1 or X>X4 or Y<Y1 or Y>Y4 (step S2). That is, the pixel coordinates detection part 18 determines whether or not the display positions (X,Y) of the pixel images are outside the RSD display region B.

When it is determined that the display position (X,Y) of the pixel image is outside the RSD display region B in step S2 (step S2: Yes), the boundary allocation processing part 20 controls the switch part 22 such that the pixel image having brightness values (0,0,0) in place of the brightness values (R,G,B) of the pixel image at the point (X,Y) is outputted to the first buffer 16 (step S5). At the same time, the boundary allocation processing part 20 controls the switch part 22 so that the pixel image at the point (X, Y) picked up from the first frame buffer 12 by the pixel pick-up part 19 is outputted to the second buffer 17 via the synthesizing part 15 (step S6). In this manner, the image formed of the three-dimensional content is synthesized to a background image to be displayed only by the projector 1 out of the images to be displayed on the projector display region A.

Further, in step S2, when it is determined that the display position (X, Y) of the pixel image is not outside the RSD display region B in step S2 (step S2: No), the boundary allocation processing part 20 controls the switch part 22 so that the pixel image at the point (X,Y) picked up from the first frame buffer 12 by the pixel pick-up part 19 is outputted to the first buffer 16 (step S3) and, at the same time, the boundary allocation processing part 20 controls the switch part 22 so that the pixel image having the brightness values (0,0,0) is outputted to the second buffer 17 in place of the brightness values (R,G,B) of the pixel image at the point (X,Y) (Step S4).

In this manner, in the image display system S of this embodiment, out of the image formed of the three-dimensional content, the image portion in the RSD display region B can be displayed on the retinal scanning display 2 as the three-dimensional image, and the image portion outside the RSD display region B out of the image formed of the three-dimensional content can be displayed as the two-dimensional image. Accordingly, it is possible to provide the image display system S which combines the projection of the image on the screen and the projection of the image on the pupil 41 of the user.

Further, by properly allocating the images to be displayed on the projector 1 and the retinal scanning display 2, the broadening of viewing angle can be realized and, at the same time, the reality acquired by a stereoscopic image can be maintained.

Here, the image distribution circuit 14 of the image display system S includes a positional direction detection part which detects the position and the direction of the retinal scanning display 2. The positional direction detection part includes, for example, a camera part which photographs a viewing field in front of a user of the retinal scanning display 2, and an image analyzing part for detecting the projector display region A where the projector 1 projects the image on the screen by analyzing the image photographed by the camera part.

The positional direction detection part, for example, detects the position and the direction of the retinal scanning display 2 by detecting the projector display region A using the image analyzing part, and moves or changes the image to be projected onto a pupil of a user. That is, the image analyzing part selects an image to be displayed on the retinal scanning display 2 based on the relative positional relationship between the display region A to be projected onto the screen by the projector 1 and the region B displayable by the retinal scanning display 2. Accordingly, the second region can be moved and changed based on the position and the direction of the retinal scanning display 2 and hence, even when the retinal scanning display 2 is mounted on a head of the user like glasses, an image to be displayed can be corrected in response to the movement of the head of the user whereby an image with no discomfort can be displayed.

Further, the image distribution circuit 14 of the image display system S also includes a viewing direction detection part for detecting the viewing direction of the user. The viewing direction detection part, for example, detects the viewing direction of the user by detecting a position of the pupil of the user.

Then, based on the relative positional relationship between the display region A to be projected onto the screen by the projector 1 and the region B displayable by the retinal scanning display 2, an image to be displayed on the retinal scanning display 2 is selected. Accordingly, in response to the viewing direction of the user detected by the viewing-direction detection part, the RSD display region B can be moved or changed. Accordingly, even when the retinal scanning display 2 is mounted on the head of the user like glasses, for example, the image to be displayed can be corrected in response to the viewing direction of the user and hence, an image with no discomfort can be displayed.

In this embodiment, the video signals generated by the three-dimensional content generation part 10 is stored in the first frame buffer 12 for every frame, the pixel image is picked up from the first frame buffer 12, and the display position of the pixel image is determined. However, the display position of the pixel image may be directly determined based on the video signal.

That is, a video signal input part for inputting the video signal formed of the three-dimensional content is provided in place of the first frame buffer 12, and the pixel coordinates detection part 18 of the image distribution circuit 14 determines the display position of the three-dimensional content based on a waveform of the video signal inputted to the video signal input part. This embodiment is specifically explained in conjunction with attached drawings hereinafter.

First of all, the determination of the display position of the three-dimensional content in the horizontal direction is explained in conjunction with FIG. 7A. FIG. 7A shows the relationship between a first-image-use signal and a second-image-use signal which are generated by the image distribution circuit 14 based on a horizontal synchronizing signal and a video signal (expressed as a brightness level in FIG. 7A) extracted from a video signal waveform inputted from the video signal input part.

The image distribution circuit 14 detects the horizontal synchronizing signal from the video signal waveform inputted from the video signal input part. Then, as shown in FIG. 7A, based on a lapsed time from the detection of the horizontal synchronizing signal, the image distribution circuit 14 outputs the video signal in a predetermined interval (signal region ranging from X1 to X4) as the second-image-use signal. Further, the image distribution circuit 14, based on the lapsed time from the detection of the horizontal synchronizing signal, outputs the video signal in a predetermined interval (signal regions ranging from X0 to X1, X4 to X5) as the first-image-use signal.

Next, the determination of the display position of the three-dimensional content in the vertical direction is explained in conjunction with FIG. 7B. FIG. 7B shows the relationship between the first-image-use signal and the second-image-use signal which are generated by the image distribution circuit 14 based on a vertical synchronizing signal, a horizontal synchronizing signal and a video signal extracted from a video signal waveform inputted from the video signal input part. For the sake of brevity, the video signal shown in FIG. 7B is assumed to be hardly changed between the horizontal synchronizing signals, and the video signal between the vertical synchronizing signals is expressed in a simplified manner with a waveform similar to the waveform of the video signal during the horizontal scanning period (for example, FIG. 7A). Further, the horizontal synchronizing signal and the vertical synchronizing signal are also expressed with simplified signal waveforms compared to usual corresponding signals. Further, in FIG. 7A and FIG. 7B, it is needless to say that a blanking interval between the vertical synchronizing signals and a blanking interval between the horizontal synchronizing signals may not agree with each other between the first-image-use signal and the second-image-use signal.

The image distribution circuit 14 detects the vertical synchronizing signal from the video signal waveform inputted from the video signal input part. Then, based on a lapsed time from the detection of the vertical synchronizing signal, the image distribution circuit 14 outputs the video signal in a predetermined interval (signal region ranging from Y1 to Y4) as the second-image-use signal. Further, the image distribution circuit 14, based on the lapsed time from the detection of the vertical synchronizing signal, outputs the video signal in a predetermined interval (signal regions ranging from Y0 to Y1, Y4 to Y5) as the first-image-use signal. Here, even in the predetermined intervals (signal regions ranging from Y1 to Y4), the video signal in the predetermined intervals (signal regions ranging from X0 to X1, X4 to X5) is outputted as the first-image-use signal.

In this manner, the image distribution circuit 14, based on a lapsed time from the detection of the horizontal synchronizing signal and the vertical synchronizing signal having the video signal waveform, determines the display position of the three-dimensional content from the waveform of the video signal. That is, the image distribution circuit 14 determines the image to be displayed on the projector display region A and the image to be displayed on the RSD display region B based on the video signal waveform. Since the display position of the three-dimensional content image can be detected based on the video signal waveform, it is possible to prevent the constitution for detecting the display position from becoming complicated.

Second Embodiment

The image display system S of the second embodiment is configured such that a three-dimensional content is displayed on a retinal scanning display 2 as a three-dimensional image when a specified position (for example, a center portion) of the three-dimensional content is within the RSD display region B, while the three-dimensional content is displayed on a projector as a two-dimensional image when the specified position is outside the RSD display region B.

The second embodiment is substantially equal to the first embodiment with respect to the constitution and the manner of operation except for that the manner of operation of the image distribution circuit 14 of this embodiment partially differs from the manner of operation of the image distribution circuit 14 of the first embodiment. Accordingly, the explanation of the constitution of the image display system S is omitted here and the image distribution circuit 14 which constitutes a part different from the corresponding part of the first embodiment is explained hereinafter.

Figure 8A:
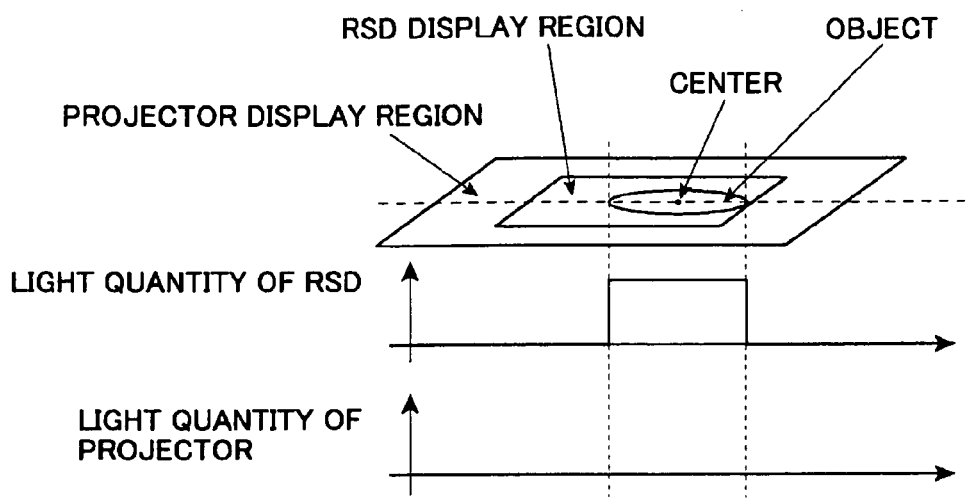
FIG. 8A and FIG. 8B are explanatory views of the manner of operation of an image distribution circuit of a second embodiment.
Figure 8B:
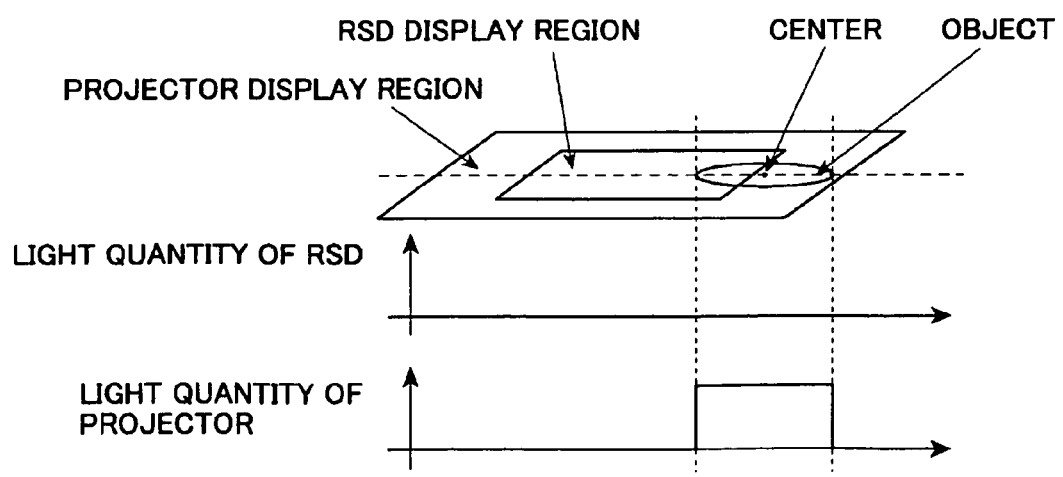

According to the image distribution circuit 14 of this embodiment, in a state that the three-dimensional content image strides over the inside and the outside of the RSD display region B as described above, when a specified position of the three-dimensional content (for example, the center of the three-dimensional content) is within an RSD display region B, an image formed of a three-dimensional content is displayed on a retinal scanning display 2 as a three-dimensional image (see FIG. 8A), while when the specified position of the three-dimensional content is outside the RSD display region B, the three-dimensional content is displayed on a projector 1 as a two-dimensional image (see FIG. 8B).

Figure 9:
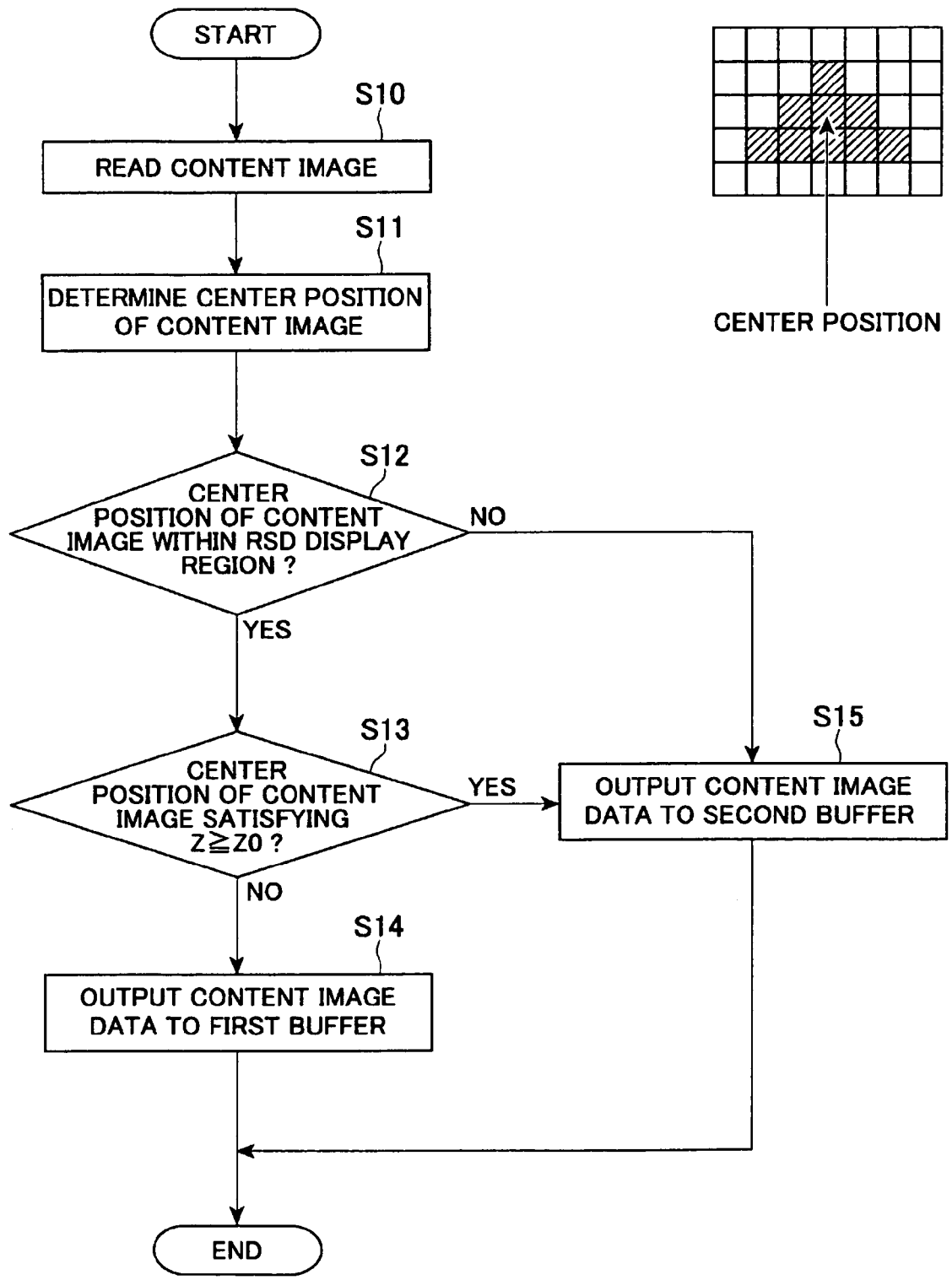
FIG. 9 is a flow chart of the manner of operation of the image distribution circuit of the second embodiment.

When an operation of the image display system S is started, as shown in FIG. 9, a three-dimensional content is generated by a three-dimensional content generation part 10, is outputted to the first frame buffer 12, and is buffered in the first frame buffer 12 for every frame unit. Image data (data including pixel images of X5×Y5) corresponding to one frame buffered by the first frame buffer 12 is sequentially read by the pixel coordinates detection part 18 such that the brightness values (R,G,B) of the pixel images at points (X,Y) are sequentially read in order from the pixel image at a point (0, 0) to the pixel image at a point (X5,Y5) through the pixel image at a point (1, 0), . . . , the pixel image at a point (X5, 0), the pixel image at a point (0, 1), . . . , the pixel image at a point (X5, 1) and, at the same time, the coordinate positions of the plurality of pixel images in the three-dimensional content are acquired (step S10).

Next, based on the acquired coordinates positions of the plurality of pixel images in the three-dimensional content, the pixel coordinates detection part 18 determines a center position (Xa, Ya) of the three-dimensional content image. This center position is calculated by a general calculation method of a position of the center of gravity of a plane figure (step S11). Here, whether or not the pixel image is the three-dimensional content is determined by the pixel coordinates detection part 18 based on whether or not the pixel coordinates is the three-dimensional pixel coordinates. That is, the pixel coordinates detection part 18 determines whether or not the pixel coordinates includes the coordinates in the depth Z direction.

Thereafter, the pixel coordinates detection part 18 determines whether or not the center position (Xa, Ya) of the three-dimensional content is within a range of X1<Xa<X4 as well as Y1<Ya<Y4 (step S12). That is, the pixel coordinates detection part 18 determines whether or not the center position (Xa, Ya) of the three-dimensional content is within the RSD display region B which is the display region of the retinal scanning display 2.

When it is determined that the center position (Xa, Ya) of the three-dimensional content is within the RSD display region B in step S12 (step S12: Yes), the pixel coordinates detection part 18 determines whether or not a depth Z corresponding to the pixel image at the center position of the content is equal to or more than Z0 (step S13).

Then, when it is determined that the depth z corresponding to the pixel image at the center position (Xa, Ya) of the three-dimensional content is less than Z0 in step S13 (step S13: No), the boundary allocation processing part 20 controls the switch part 22 so that all pixel images formed of the three-dimensional content image are outputted to the first buffer 16 (step S14).

On the other hand, when it is determined that the center position (Xa, Ya) of the three-dimensional content is not within the RSD display region B in step S12 (step S12: No) or when it is determined that the depth Z corresponding to the pixel image at the center position of the content is equal to or more than Z0 in step S13 (step S13: Yes), the boundary allocation processing part 20 controls the switch part 22 so that all pixel images each formed of the three-dimensional content are outputted to the synthesizing part 15. In this manner, the images formed of the three-dimensional content are synthesized to a background image displayed only by the projector 1 out of the image to be displayed on the projector display region A by the synthesizing part 15, and the synthesized image is outputted to the second buffer 17 (step S15).

In this manner, the image display system S of this embodiment can perform the determination based on the specified point such as the center position of the three-dimensional content thus facilitating the determination. That is, it is sufficient for the image display system S to determine the region where the specified position of the three-dimensional content is present, and it is unnecessary for the image display system S to carry out the determination with respect to the pixels in the whole image formed of the three-dimensional content.

Further, by determining the depth information corresponding to the specified-position image formed of the three-dimensional content, the image is displayed on the retinal scanning display 2 when the depth of the specified-position image is smaller than a predetermined depth, and the image is displayed on the projector 1 when the depth of the specified position-image is equal to or less than the predetermined depth and hence, a stereoscopic property of the three-dimensional content can be maintained.

Third Embodiment

The image display system S of the third embodiment is configured such that when it is determined that a plurality of three-dimensional pixel coordinates which constitutes a three-dimensional content stride over the inside and the outside of an RSD display region B, at least one of brightness, color and depth is made different from each other between a third region C (fade region C) in the vicinity of an outer periphery of the RSD display region B and a region other than the third region C and hence, an image which makes a viewer difficult to recognize a boundary can be displayed.

The third embodiment is substantially equal to the first embodiment with respect to the constitution and the manner of operation except for that the manner of operation of the image distribution circuit 14 of this embodiment partially differs from the manner of operation of the image distribution circuit 14 of the first embodiment. Accordingly, the explanation of the constitution of the image display system S is omitted here and the image distribution circuit 14 which constitutes a part different from the corresponding part of the first embodiment is explained hereinafter.

Figure 10:
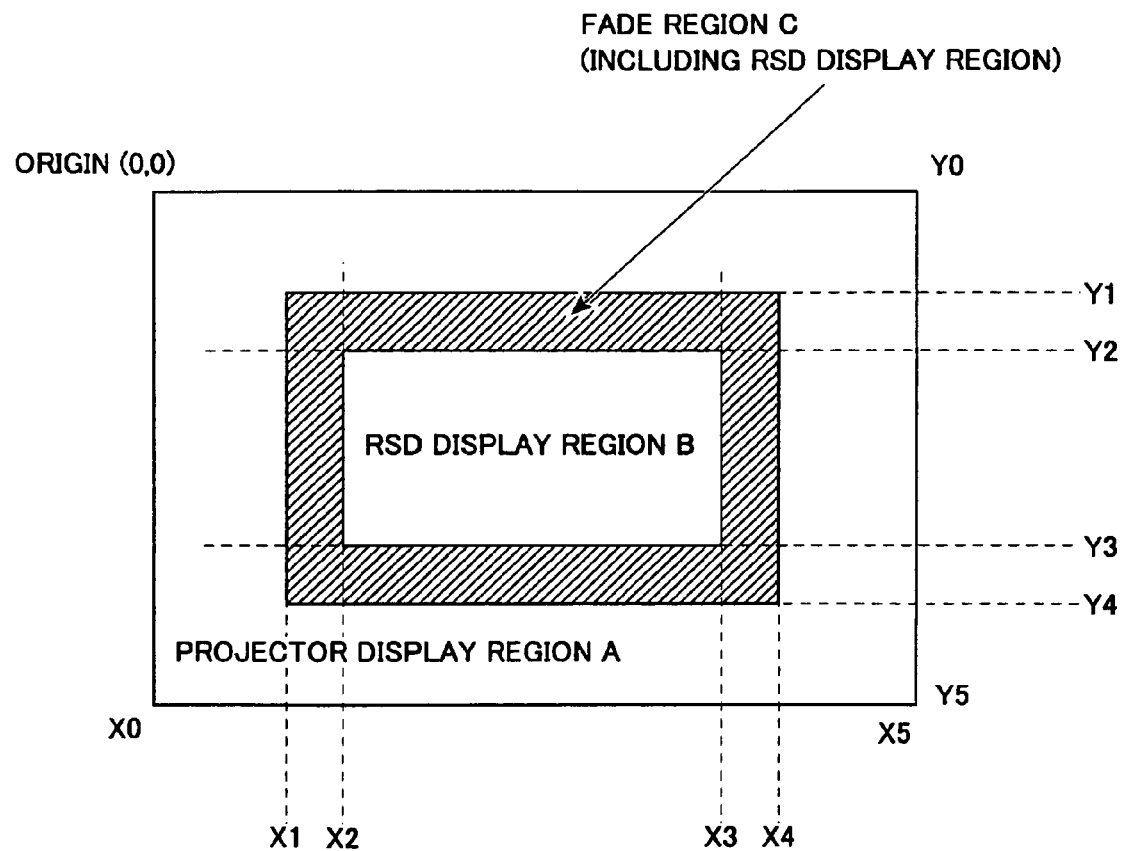
FIG. 10 is an explanatory view of the manner of operation of an image distribution circuit of a third embodiment.
Figure 11:
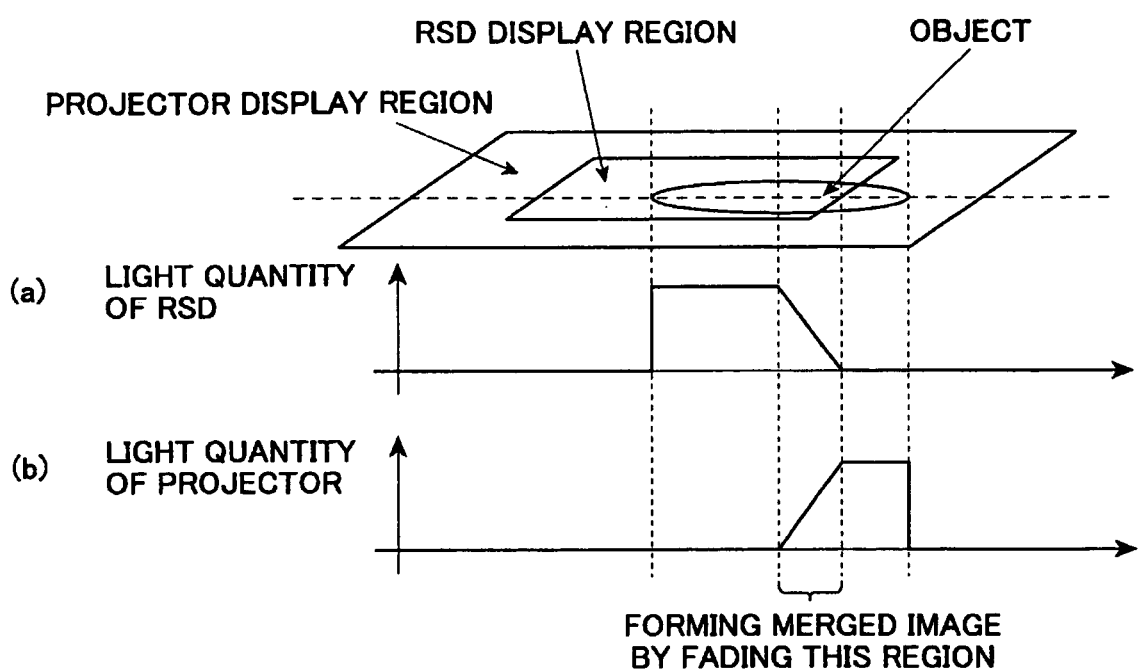
FIG. 11 is an explanatory view of a display region of the third embodiment.

The image distribution circuit 14 of this embodiment performs a control as shown in FIG. 10 and FIG. 11. That is, in displaying the image formed of the three-dimensional content striding over the inside and the outside of the RSD display region B, out of the three-dimensional content displayed in the RSD display region B, the pixel image in the fade region C which constitutes the third region in the vicinity of an outer periphery of the RSD display region B is corrected by a correction part 21 such that the brightness of the pixel image is gradually darkened and a depth is increased as the pixel image approaches the outside of the RSD display region B compared to the pixel image in the region outside the third region C, and the corrected pixel image is displayed on the retinal scanning display 2 (see FIG. 11A).

Further, the image distribution circuit 14 of this embodiment also performs a following control. That is, out of the three-dimensional content, the image outside the RSD display region B is displayed on the projector 1 as the two-dimensional image, while out of the image formed of the three-dimensional content, the pixel image positioned in the fade region C is corrected by the correction part 21 such that the brightness of the pixel image is gradually darkened as the pixel image approaches the center of the RSD display region B compared to the pixel image outside the RSD display region B, and the corrected pixel image is displayed on the projector 1 (see FIG. 11B). These operations are explained hereinafter.

Figure 12:
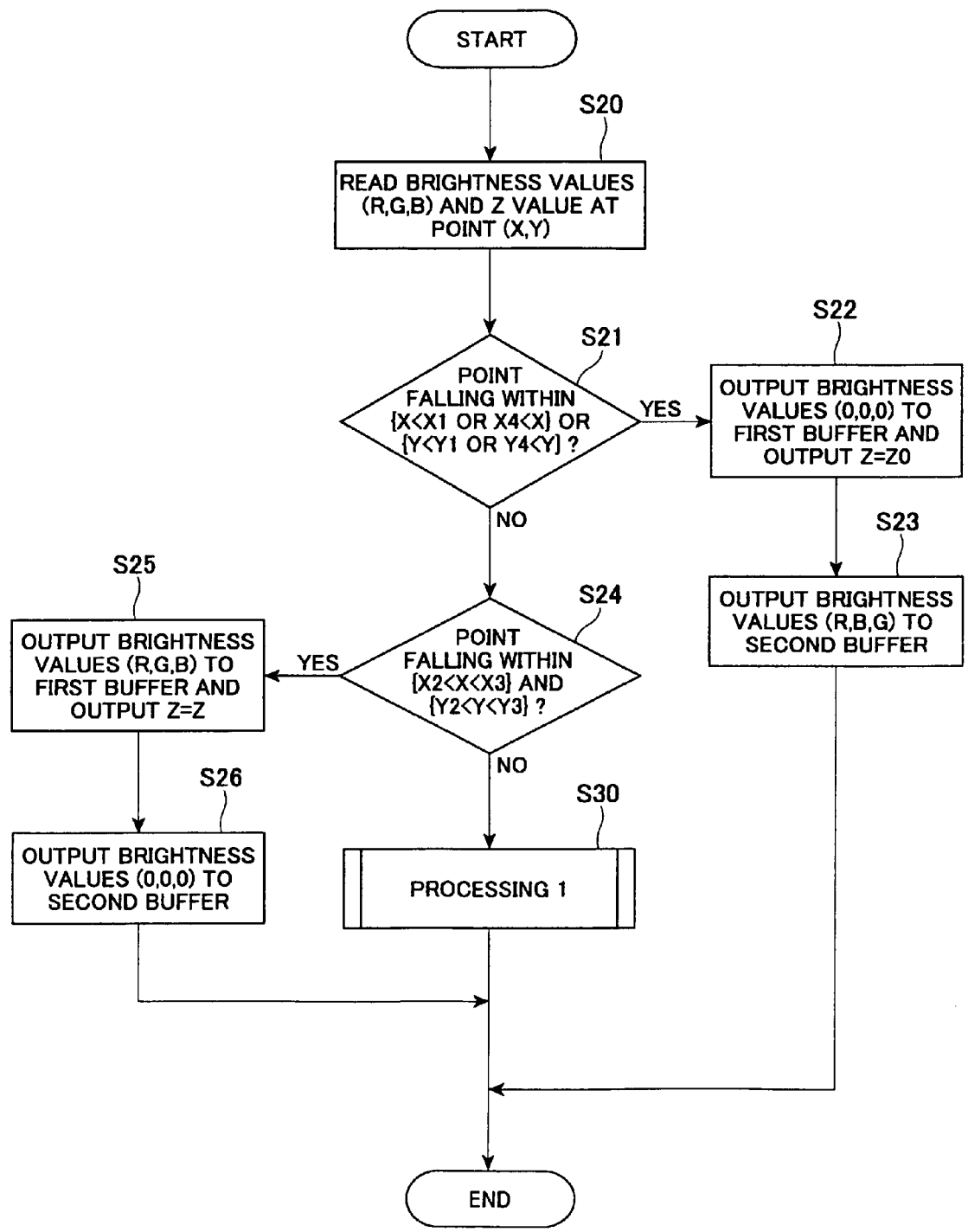
FIG. 12 is flow chart of the manner of operation of the image distribution circuit of the third embodiment.

First of all, when an operation of the image display system S is started, as shown in FIG. 12, a three-dimensional content is generated by a three-dimensional content generation part 10, is outputted to the first frame buffer 12, and is buffered in the first frame buffer 12 for every frame unit. Image data (data including pixel images of X×Y5) corresponding to one frame buffered by the first frame buffer 12 is sequentially read by the pixel coordinates detection part 18 such that the brightness values (R,G,B) of the pixel images at points (X,Y) are sequentially read in order from the pixel image at a point (0, 0) to the pixel image at a point (X5, Y5) through the pixel image at a point (1, 0), . . . , the pixel image at a point (X5, 0), the pixel image at a point (0, 1), . . . , and the pixel image at a point (X5, 1) (step S20).

Next, the pixel coordinates detection part 18 determines whether or not the display positions (X, Y) of the sequentially-read pixel images fall within a range of X<X1, X>X4 or within a range of Y<Y1, Y>Y4 (step S21). That is, the display position (X, Y) of the pixel image is determined based on whether or not the pixel image is outside the RSD display region B.

When it is determined that the display position (X,Y) of the pixel image is outside the RSD display region B in step S21 (step S21: Yes), the boundary allocation processing part 20 controls the switch part 22 so that the pixel image having the brightness values (0, 0, 0) in place of the brightness values (R, G, B) of a pixel image at the point (X, Y) is outputted to the first buffer 16 (step S22). Thereafter, the boundary allocation processing part 20 controls the switch part 22 so that the pixel image at the point (X, Y) picked up from the first frame buffer 12 by the pixel pick-up part 19 is outputted to the second buffer 17 via the synthesizing part 15 (step S23). In this manner, the image formed of the three-dimensional content is synthesized to a background image displayed only by the projector 1 out of the image to be displayed on the projector display region A.

Further, when it is determined that the display position (X, Y) of the pixel image is not outside the RSD display region B in step S21 (step S21: No), the pixel coordinates detection part 18 further determines whether or not the display positions (X, Y) of the sequentially-read pixel images fall within a range of X2<X<X3 and within a range of Y2<y<Y3 (step S24).

When it is determined that the display position (X,Y) of the pixel image falls within the range of X2<X<X3 and within a range of Y2<Y<Y3 in step S24 (step S24: Yes), the boundary allocation processing part 20 controls the switch part 22 so that the pixel image at the point (X,Y) picked up from the first frame buffer 12 by the pixel pick-up part 19 maintains a depth Z thereof as it is and the pixel image is outputted to the first buffer 16 (step S25). Thereafter, the boundary allocation processing part 20 controls the switch part 22 so that the pixel image having the brightness values (0, 0, 0) in place of the brightness values (R, G, B) of the pixel image at the point (X, Y) is outputted to the second buffer 17 (step S26).

Further, when it is determined that the display position (X, Y) of the pixel image does not fall within the range of X2<X<X3 and within a range of Y2<Y<Y3 in step S24 (Step S24: No), the processing of step S30 is executed. This processing is provided for executing processing of the image in the fade region and the operation of the processing is explained in conjunction with a flowchart shown in FIG. 13.

Figure 13:
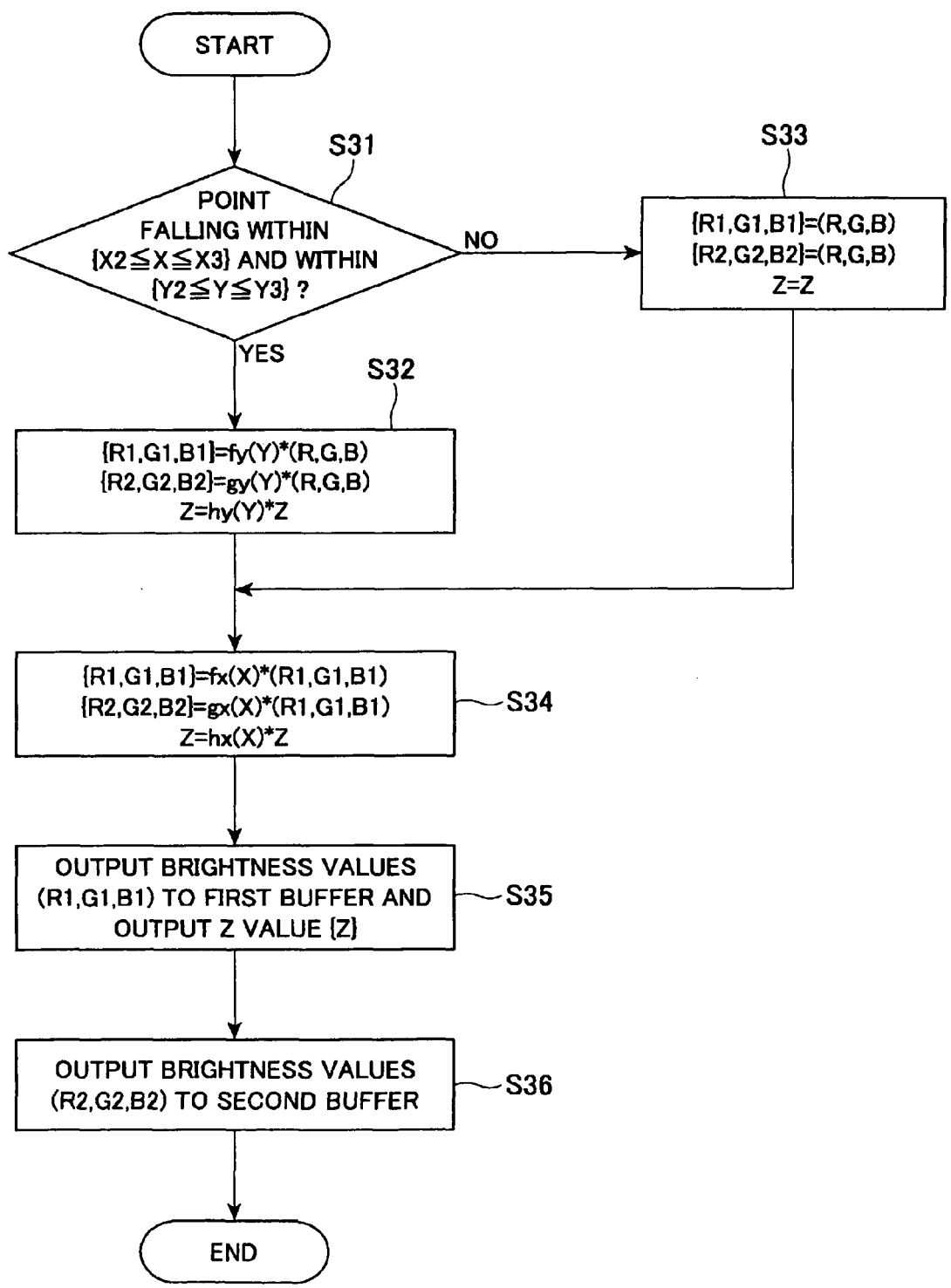
FIG. 13 is flow chart of the manner of operation of the image distribution circuit of the third embodiment.

As shown in FIG. 13, the pixel coordinates detection part 18 determines whether or not the display position (X, Y) of the pixel image fall within a range of $X21 \leq X \leq X3$ and $Y2 \leq Y \leq Y3$ (step S31).

When it is determined that the display position (X,Y) of the pixel image falls within the range of $X2 \leq X \leq X3$ and $Y2 \leq Y \leq Y3$ in step S31 (step S31: Yes), the brightnesses (R, G, B) of the pixel image at the point (X,Y) is corrected by the correction part 21 in the X direction thus generating the pixel image for the projector 1 and the pixel image for the retinal scanning display 2 (step S32).

That is, the pixel images generated by the correction part 21 are constituted of following pixel images.

(a) pixel image for retinal scanning display 2 brightness$(R1, G1, B1) = Fy(Y) \times (R, G, B)$ depth $Z = Hy(Y) \times Z$ (b) pixel image for projector 1 brightness$(R2, G2, B2) = Fy(Y) \times (R, G, B)$ depth $Z = Hy(Y) \times Z$

Here, in this embodiment, as functions Fy(Y), Gy(Y), Hy(Y), at an interval of $Y1 \leq Y \leq Y2$, for example, functions $Fy(Y) = \{1/(Y2-Y1)\} \times (Y-Y1)$, Gy $(Y) = 1 - Fy(Y)$, $Hy(Y) = \{(Z0-1)/(Y2-Y1)\} \times (Y-Y1) + 1$ are adopted. However, any function can be used provided that the function satisfies following conditions.

$Fy(Y1) = 0$, $Gy(Y1) = 1$, $Hy(Y1) = Z0$ $Fy(Y2) = 1$, $Gy(Y2) = 0$, $Hy(Y2) = 1$ $dFy(Y1 \leq X \leq Y2)/dt \geq 0$ $dGy(Y1 \leq X \leq Y2)/dt \leq 0$ $dHy(Y1 \leq X \leq Y2)/dt \leq 0$ (when $Z0 \geq 1$ is satisfied)

$dHy(Y1 \leq X \leq Y2)/dt \geq 0$ (when $Z0 < 1$ is satisfied)

Here, Z0 is a preliminarily determined depth position.

On the other hand, when it is determined that the display position (X, Y) of the pixel image does not fall within the range of $X2 \leq X \leq X3$ and $Y2 \leq Y \leq Y3$ in step S31 (step S31: No), the brightnesses (R, G, B) of the pixel image at the point (X, Y) are corrected by the correction part 21 in the X direction thus generating the pixel image having brightnesses (R1, G1, B1) for the projector 1 and the pixel image having brightnesses (R2, G2, B2) for the retinal scanning display 2 (step S33). Here, the relationship of (R1, G1, B1)=(R2, G2, B2)= (R, G, B) is established.

Upon completion of processing in step S32 or step S33, based on the brightness (R1, G1, B1) of the pixel image, after processing the pixel image at the point (X, Y) in the X direction, the pixel image for the projector 1 and the pixel image for the retinal scanning display 2 in the Y direction are generated by the correction part 21 (step S34).

That is, the pixel images generated by the correction part 21 are constituted of following pixel images.

(a) pixel image for retinal scanning display 2 brightness$(R1,G1,B1)=Fx(X)\times(R1,G1,B1)$ depth $Z=Hx(X)\times Z$ (b) pixel image for projector 1 brightness$(R2,G2,B2)=Gx(X)\times(R1,G1,B1)$ depth $Z=Hx(X)\times Z$

Here, in this embodiment, as functions Fx(X), Gx(X), Hx(X), at an interval of $X1 \leq X \leq X2$, for example, functions Fx $(X)=\{1/(X2-X1)\}\times(X-X1)$, $Gx(X)=1-Fx(X)$, $Hx(X)=\{(Z0-1)/(X2-X1)\}\times(X-X1)+1$ are adopted. However, any function can be used provided that the function satisfies following conditions.

$Fx(X1)=0, Gx(X1)=1, Hx(X1)=Z0$ $Fx(X2)=1, Gx(X2)=0, Hx(X2)=1$ $dFx(X1 \leq X \leq X2)/dt \geq 0$ $dGx(X1 \leq X \leq X2)/dt \leq 0$ $dHx(X1 \leq X \leq X2)/dt \leq 0$ (when $Z0 \geq 1$ is satisfied)

$dHx(X1 \leq X \leq X2)/dt \geq 0$ (when $Z0 < 1$ is satisfied)

Here, Z0 is a preliminarily determined depth position.

Upon completion of the processing in steps 34, the boundary allocation processing part 20 controls the switch part 22 so that the pixel images (R1, G1, B1) and the depth Z for the retinal scanning display 2 are outputted to the first buffer 16 (step S35).

Further, the boundary allocation processing part 20 controls the switch part 22 so that the pixel images (R2, G2, B2) for the projector 1 are outputted to the second buffer 17 via the synthesizing part 15 (step S36). In this manner, a portion of the image formed of the three-dimensional content is synthesized to the background image displayed only by the projector 1 out of the image to be displayed on the projector display region A.

As described above, according to the image display system S of this embodiment, when the specified image is positioned striding over the inside of the second region and the outside of the second region, the specified image is displayed on the second image display device by making the depth of the image different from each other between the inside and outside of the second region in the vicinity of an outer periphery of the second region. Accordingly, by allowing the specified image to have the depth visually substantially equal to the depth of the image to be displayed on the screen as the specified image approaches the vicinity of the outer periphery of the second region, for example, it becomes more difficult for a user to feel a boundary of the images on the outer periphery of the second region.

Further, by gradually changing the depth in the fade region C by correcting the depth information of the three-dimensional content, the stereoscopic property of the three-dimensional content can be maintained.

Here, the fade region C may differ depending on a size of the three-dimensional content. In this case, coordinates positions of the plurality of pixel images on the three-dimensional content are acquired by the pixel coordinates detection part 18. Thereafter, the boundary allocation processing part 20 determines the size of the three-dimensional content based on the plurality of coordinates positions acquired by the pixel coordinates detection part 18. Then, an area of the fade region C is changed.

For example, the fade region C may be controlled such that the fade region C is enlarged when the three-dimensional content is large, while the fade region C is narrowed when the three-dimensional content is small.

In this manner, by changing the fade region C which displays the three-dimensional content from both of the projector 1 and the retinal scanning display 2 depending on the size of the three-dimensional content which constitutes the specified image, it becomes more difficult for a user to feel the boundary of images at the outer periphery of the second region.

Further, this embodiment may also determine the display position directly from the video signals. FIG. 14A and FIG. 14B show the relationship between the first-image-use signal and the second-image-use signal generated by the image distribution circuit 14 based on the horizontal synchronizing signal, the vertical synchronizing signal and the video signal extracted from the video signal waveform in such a case. Although the manner of operation of this embodiment is basically equal to the manner of operation of the first embodiment, this embodiment differs from the first embodiment with respect to a point that the first-image-use signal and the second-image-use signal are generated by performing the correction with respect to the specified intervals (signal regions ranging from X1 to X2, X3 to X4, Y1 to Y2, Y3 to Y4). For the sake of brevity, the video signal shown in FIG. 14B is assumed to be hardly changed between the horizontal synchronizing signals, and the video signal between the vertical synchronizing signals is expressed in a simplified manner with a waveform similar to the waveform of the video signal during the horizontal scanning period (for example, FIG. 14A). Further, the horizontal synchronizing signal and the vertical synchronizing signal are also expressed with simplified signal waveforms compared to usual corresponding signals. Further, in FIG. 14A and FIG. 14B, it is needless to say that a blanking interval between the vertical synchronizing signals and a blanking interval between the horizontal synchronizing signals may not agree with each other between the first-image-use signal and the second-image-use signal.

The image distribution circuit 14 detects the horizontal synchronizing signal from the video signal waveform inputted from the video signal input part. Then, based on a lapsed time from the detection of the horizontal synchronizing signal and the vertical synchronizing signal, the image distribution circuit 14 outputs the video signal in a specified interval (signal region ranging from X1 to X4 and signal region ranging from Y1 to Y4) as the second-image-use signal after adding the predetermined correction to the video signal at predetermined intervals (signal regions ranging from X1 to X2, X3 to X4, Y1 to Y2, Y3 to Y4). Further, based on a lapsed time from the detection of the horizontal synchronizing signal and the vertical synchronizing signal, the image distribution circuit 14 outputs the video signal in specified intervals (signal region ranging from X0 to X2, X3 to X5, Y0 to Y2, Y3 to Y5) as the first-image-use signal after adding the predetermined correction to the video signal at predetermined intervals (signal regions ranging from X1 to X2, X3 to X4, Y1 to Y2, Y3 to Y4).

In this manner, based on the video signal waveform, the image to be displayed on the projector display region A, the image to be displayed on the RSD display region B and the image to be displayed on the fade region C are determined. Since the display position of the three-dimensional content image can be detected based on the video signal waveform, it is possible to prevent the constitution for detecting the display position from becoming complicated.

In the above-mentioned embodiment, the manners of operations are explained separately with respect to the above-mentioned first to third embodiments. However, the manners of operations of these embodiments may be combined with each other.

For example, in the image distribution circuit 14, with respect to the image distribution method used when the plurality of three-dimensional pixel coordinates which constitute the three-dimensional content strides over the inside and the outside of the RSD display region B, the following image distribution methods (1) to (3) can be selectively used. By selecting any one of these image distribution methods using an input part not shown in the drawing which constitutes a selection means, the image distribution circuit 14 distributes the image by the selected image distribution method.

(1) Out of the three-dimensional content The image portion in the RSD display region B is displayed on the retinal scanning display 2 as the three-dimensional image, and the image portion outside the RSD display region B is displayed on the projector 1 as the two-dimensional image.

(2) The three-dimensional content is displayed on the retinal scanning display 2 as the three-dimensional image when the specified position of the three-dimensional content is within the RSD display region B, while the three-dimensional content is displayed on the projector 1 as the two-dimensional image when the specified position of the three-dimensional content is outside the RSD display region B.

(3) Out of the three-dimensional content, the image within the RSD display region B is displayed on the retinal scanning display 2 as the three-dimensional image by making at least one of brightness and color of the pixel different between the third region C in the vicinity of the outer periphery of the RSD display region B and the region other than the third region C by the correction part 21. Further, out of the three-dimensional content, the image outside the RSD display region B is displayed on the projector 1 as the two-dimensional image and, at the same time, at least one of brightness and color of the image in the third region C is made different from the corresponding brightness or color of the image outside the RSD display region B by the correction part 21, and the image is displayed on the projector 1 as the two-dimensional image.

Further, even when the first and second image display devices are constituted of the two-dimensional display device which cannot perform the display in the depth direction, by making use of the difference between the respective display positions of the first and second image display devices, both display devices may exchange content inside and outside the RSD display region B. Further, the content may be two dimensional instead of being three dimensional.

Further, in the above-mentioned first to third embodiments, the explanation is made by using the projector as the first image display device as an example. However, various large-screen displays such as a large-sized liquid crystal television receiver set or a large-sized plasma display can be used in place of the projector.

Further, in the above-mentioned embodiments, the pixel coordinates detection part 18 possesses the function of a determination part. However, the function of the determination part may be imparted to the boundary allocation processing part instead of the pixel coordinates detection part 18.

What is claimed is:

1. An image display system comprising:
   a first image display device which displays a first image in a first region;
   a second image display device which displays a second image in a second region provided in the first region by projecting an image onto a pupil of a user;
   a determination part which determines a position for displaying a specified image out of the image to be displayed in the first region; and
   a display control part which allows the second image display device to display the specified image as the second image when it is determined by the determination part that a position for displaying the specified image falls within the second region, and allows the first image display device to display the specified image as the first image when it is determined by the determination part that the position for displaying the specified image falls outside the second region.

2. An image display system according to claim 1, wherein the image display system further comprises a synthesizing part which produces a synthesized image by synthesizing the specified image to a background image displayed only by the first image display device out of the image to be displayed in the first region, and
   the display control part is configured to display the synthesized image as the first image by the first image display device when it is determined by the determination part that the position where the specified image is to be displayed falls outside the second region.

3. An image display system according to claim 1, wherein the display control part is configured, when it is determined by the determination part that the specified image strides over the inside of second region and the outside of the second region, to display an image in the second region out of the specified image as the second image by the second image display device, and to display an image outside the second region out of the specified image as the first image by the first image display device.

4. An image display system according to claim 1, wherein the determination part is configured to determine whether or not a specified position in the inside of the specified image falls within the second region, and
   the display control part is configured to display the specified image as a second image by the second image display device when the specified position falls within the second region, and to display the specified image as a first image by the first image display device when the specified position falls outside the second region.

5. An image display system according to claim 1, wherein the image display system further comprises a video signal input part which inputs a video signal of the specified image, and
   the determination part is configured to determine, based on a waveform of the video signal, an image within the first region out of the specified image as a first image to be displayed on the first image display device, and an image within the second region out of the specified image as a second image to be displayed on the second image display device.

6. An image display system according to claim 1, wherein the display control part is configured, when it is determined by the determination part that the specified image strides over the inside of the second region and the outside of the second region, to display an image in the second region out of the specified image as the second image by the second image display device by making at least one of brightness and color of the image in the second region different from each other between a third region in the vicinity of an outer periphery of the second region and a region outside the third region, and to display an image outside the second region out of the specified image as the first image by the first image display device, and to display an image in the third region as the first image by the first image display device by making the image in the third region different from the image in the second region in at least either one of brightness and color.

7. An image display system according to claim 1, wherein the display control part is configured, when it is determined by the determination part that the specified image strides over the inside of the second region and the outside of the second region, to display an image in the second region out of the specified image as the second image by the second image display device by making a depth of the image in the second region different from each other between a third region in the vicinity of an outer periphery of the second region and a region outside the third region, and to display an image outside the second region out of the specified image as the first image by the first image display device.

8. An image display system according to claim 6, wherein the display control part changes the third region corresponding to a size of the specified image.

9. An image display system according to claim 1, wherein the display control part moves or changes the second region based on the position and/or the direction of the second image display device.

10. An image display system according to claim 1, wherein the display control part includes a viewing-direction detection part which detects a viewing direction of a user, and the second region is configured to be moved and/or changed corresponding to the viewing direction detected by the viewing-direction detection part.

11. An image display system according to claim 1, wherein the second image display device is a retinal scanning display which includes a scanning mechanism which scans an optical flux modulated in response to a video signal, and displays an image by projecting an image on a pupil of the user.

12. An image display method for displaying an image on a first image display device which displays a first image in a first region and a second image display device which displays a second image in a second region provided in the first region by projecting an image onto a pupil of a user, the image display method comprising the steps of:
  determining a position for displaying a specified image out of the image to be displayed in the first region; and
  allowing the second image display device to display the specified image as the second image when it is determined that a position where the specified image is to be displayed falls within the second region, and allowing the first image display device to display the specified image as the first image when it is determined that the position where the specified image is to be displayed falls outside the second region.

* * * * *